(12) United States Patent
Chalom et al.

(10) Patent No.: US 10,423,830 B2
(45) Date of Patent: Sep. 24, 2019

(54) EYE CONTACT CORRECTION IN REAL TIME USING NEURAL NETWORK BASED MACHINE LEARNING

(71) Applicant: Intel Corporation, Santa Clara, CA (US)

(72) Inventors: Edmond Chalom, Petach Tikvah (IL); Or Shimshi, Kiryat-Ono (IL)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/136,618

(22) Filed: Apr. 22, 2016

(65) Prior Publication Data

US 2017/0308734 A1     Oct. 26, 2017

(51) Int. Cl.

| | |
|---|---|
| *G06K 9/00* | (2006.01) |
| *G06K 9/66* | (2006.01) |
| *G06K 9/62* | (2006.01) |
| *G06K 9/52* | (2006.01) |
| *G06T 3/00* | (2006.01) |
| *G06T 3/40* | (2006.01) |
| *H04N 7/14* | (2006.01) |
| *G06K 9/46* | (2006.01) |

(52) U.S. Cl.
CPC ....... *G06K 9/0061* (2013.01); *G06K 9/00281* (2013.01); *G06K 9/00617* (2013.01); *G06K 9/52* (2013.01); *G06K 9/6256* (2013.01); *G06K 9/6267* (2013.01); *G06K 9/66* (2013.01); *G06T 3/0093* (2013.01); *G06T 3/40* (2013.01); *H04N 7/147* (2013.01); *G06K 2009/4666* (2013.01)

(58) Field of Classification Search
USPC ....................................... 348/14.16
See application file for complete search history.

(56) References Cited

U.S. PATENT DOCUMENTS

| | | | |
|---|---|---|---|
| 6,714,234 B1 | 3/2004 | Hillis et al. | |
| 2003/0197779 A1* | 10/2003 | Zhang | H04N 7/144 |
| | | | 348/14.16 |

(Continued)

FOREIGN PATENT DOCUMENTS

| | | |
|---|---|---|
| KR | 1020140076949 | 6/2014 |
| KR | 1020150113795 | 10/2015 |

(Continued)

OTHER PUBLICATIONS

Kononenko et al., "Learning to look up: Realtime monocular gaze correction using machine learning", 2015 IEEE conference on Computer Vision and Pattern Recognition (CVPR), Jun. 7-12, 2015, pp. 4667-4675, ISSN: 1063-6919, IEEE, Boston, MA.

(Continued)

*Primary Examiner* — Amal S Zenati
(74) *Attorney, Agent, or Firm* — Green, Howard & Mughal LLP.

(57) ABSTRACT

Techniques related to eye contact correction to provide a virtual user gaze aligned with a camera while the user views a display are discussed. Such techniques may include encoding an eye region of a source image using a pretrained neural network to generate compressed features, applying a pretrained classifier to the features to determine a motion vector field for the eye region, and warping and inserting the eye region into the source image to generate an eye contact corrected image.

25 Claims, 13 Drawing Sheets

(56) References Cited

U.S. PATENT DOCUMENTS

| | | | |
|---|---|---|---|
| 2005/0089246 A1* | 4/2005 | Luo | G06K 9/00268 |
| | | | 382/286 |
| 2009/0238419 A1 | 9/2009 | Steinberg et al. | |
| 2012/0219180 A1 | 8/2012 | Mehra | |
| 2013/0142401 A1 | 6/2013 | Nomoto et al. | |
| 2013/0222644 A1* | 8/2013 | Son | H04N 5/23219 |
| | | | 348/239 |
| 2014/0016871 A1 | 1/2014 | Son et al. | |
| 2015/0009277 A1 | 1/2015 | Ethz | |
| 2015/0278599 A1 | 10/2015 | Zhang et al. | |
| 2015/0339512 A1* | 11/2015 | Son | G06K 9/46 |
| | | | 348/78 |
| 2016/0026847 A1 | 1/2016 | Vugdelija et al. | |
| 2016/0070952 A1 | 3/2016 | Kim et al. | |
| 2016/0104053 A1* | 4/2016 | Yin | G06K 9/00228 |
| | | | 382/156 |
| 2016/0132720 A1 | 5/2016 | Klare et al. | |
| 2016/0140383 A1 | 5/2016 | Kim et al. | |
| 2016/0307069 A1 | 10/2016 | Wu | |
| 2016/0315886 A1 | 10/2016 | Huang | |

FOREIGN PATENT DOCUMENTS

| | | | |
|---|---|---|---|
| WO | WO-9926126 A1 * | 5/1999 | ............. A61B 3/113 |
| WO | 2010148250 | 12/2010 | |

OTHER PUBLICATIONS

International Search Report & Written Opinion dated Jun. 13, 2017 for PCT Patent Application No. PCT/US17/22910.

Office Action for U.S. Appl. No. 15/136,621, dated Jul. 1, 2019.

Iqbal, T., "A Robust Real Time Eye Tracking and Gaze Estimation System Using Particle Filters", University of Texas at El Paso, Aug. 2012.

Karaaba, M.F. et al., "Machine Learning for Multi-View Eye-Pair Detection", Engineering Applications of Artificial Intelligence, 33 (0), (2014) pp. 69-79.

Song, F. et al., "Eyes closeness detection from still images with multi-scale histograms of principal oriented gradients", Pattern Recognition, 47 (9), (2014) pp. 2825-2838.

* cited by examiner

EYE CONTACT CORRECTION IN REAL TIME USING NEURAL NETWORK BASED MACHINE LEARNING

BACKGROUND

In videotelephony or video conferencing applications on laptops or other devices, the camera capturing video of the user and the display providing video of the person or people the user is speaking to may be offset. For example, the camera may be mounted above the display. As a result, the participants in the video call may not be able to simultaneously look at both the screen (to see the other participant) and the camera (which is desirable to make good, natural contact with the other participant).

Current techniques for correcting such eye contact correction problems are deficient. For example, current techniques may not be fast enough to support real time implantation, may require special additional camera hardware such as depth cameras or stereo cameras, or may not be robust enough in terms of quality. It is with respect to these and other considerations that the present improvements have been needed. Such improvements may become critical as the implementation of videotelephony in a variety of contexts becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
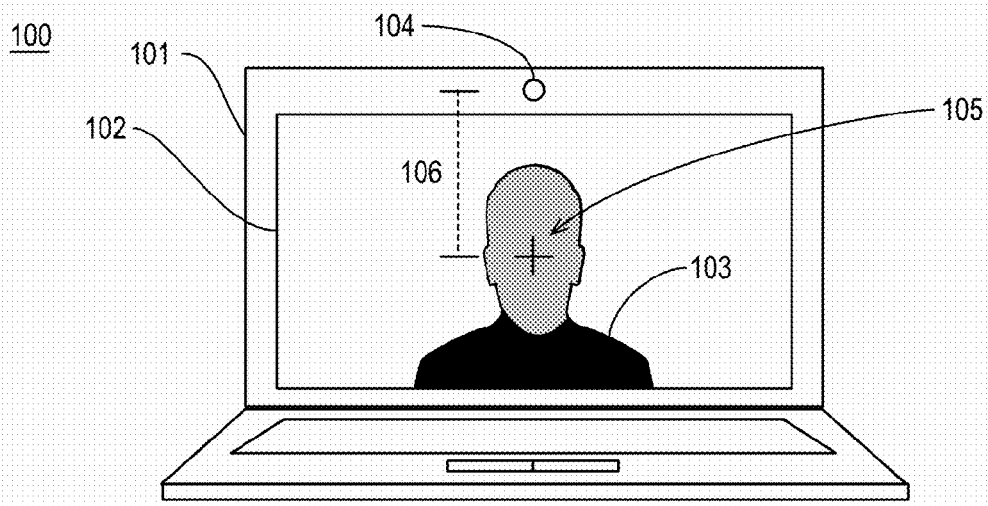
FIG. 1 illustrates an example setting for providing eye contact correction.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", or examples, or embodiments, etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to eye contact correction.

As described above, in videotelephony or video conferencing applications on laptops or other devices such as mobile devices, the camera capturing video of the user and the display providing video of the person or people the user is speaking to may be offset, which may cause an undesirable and unnatural presentment of the user such that the user is not looking at the people to whom they are speaking. For example, the offset between the camera and the display may cause a dilemma for the user such that they must choose between looking at the display (and cause their presentment to the user to whom they are speaking to appear that they are looking away) and looking at the camera (and not at the user to whom they are speaking to). The techniques discussed herein may provide real time eye contact correction (or gaze correction) using neural network based machine learning in a cameral image signal processing unit for applications such as videotelephony, video conferencing, or the like.

As discussed herein, embodiments may include a training component (e.g., performed offline) and a real time component (e.g., performed during implementation or run time) that provides eye contact correction. In the offline training component, a database of faces with a known gaze angle may be used to train a neural network and a model (e.g., a pretrained classifier such as a random forest) that may be used to predict motion vectors (e.g. a motion vector field) that may adjust the input (e.g., having an uncorrected eye region) image to a desired output (e.g., having corrected eye contact) image while running in real time. For example, the pretrained neural network may be a deep neural network, a convolutional neural network, or the like having an encode portion that generates compressed features based on a given eye region and a decode portion that generates a resultant image based on the compressed features from the encode portion. The neural network may be trained based on reducing an error between the given eye regions and resultant images of a training database, based on reducing an error between vertically filtered images from the given eye regions and resultant images of the training database, or the like as is discussed further herein.

During the real time phase, only the encode portion of the trained neural network may be implemented to generate compressed features based on an eye region of a source image. For example, an eye region of a source image may be encoded using a pretrained neural network to generate compressed features corresponding to the eye region. The pretrained classifier (e.g., a pretrained classifier such as a random forest) may determine motion vectors corresponding to the features using based on an optimal random forest tree search or the like. The motion vector field may be used to warp the eye region to generate the desired output image having corrected eye contact. Such techniques may provide improved corrected eye images, robustness (e.g., robust to local illumination changes), real time capability (e.g., faster operation), and flexibility (e.g., to train for various gaze angle corrections depending on relative positioning of the camera and display in the implementing device).

Embodiments discussed herein may provide for an eye contact corrected image from a source image such that the user may look at the display and the eye contact corrected image will correct the user's eye contact such that the eye contact corrected image provides an appearance that the user is looking at the camera. Such techniques may provide the advantage of the user being able to view the user to whom they are speaking while providing the appearance of natural eye contact. For example, the eye contact corrected image may be one image of a video sequence of images or frames that may be encoded and transmitted from a local device (e.g., of the user) to a remote device (e.g., of the user to whom the user of the local device is speaking).

In some embodiments, a source image may be obtained via a camera at a local device. Face detection and face landmark detection may be provided on the source image to detect faces and landmarks of such faces such as landmarks corresponding to eyes or eye regions. The source image may be cropped to generate eye regions based on the eye landmarks and the eye regions may be warped and reinserted into the source image to provide the eye contact corrected image. As discussed, such techniques may be provided on a sequence of images or frames and the sequence may be encoded and transmitted. In some embodiments, eye region(s) of the source image may be encoded by a pretrained neural network to generate compressed features corresponding to each eye region of the source image. For example the pretrained neural network may be a deep neural network, a convolutional neural network, a neural network having fully connected layers and convolutional layers, or the like. In an embodiment, the pretrained neural network has four layers: a convolutional neural network layer, a second convolutional neural network layer, a fully connected layer, and a second fully connected layer, in that order. A pretrained classifier may be applied to the feature sets to determine a motion vector field for each eye region of the source image and the eye region(s) of the source image may be warped based on the motion vector field(s) and integrated into the source image (e.g., into the remaining, non-eye region portion of the source image) to generate the eye contact corrected image. For example, the pretrained classifier may be a pretrained random forest classifier.

In some embodiments, during a training phase of the neural network and/or the pretrained classifier, training may be performed based on a training set of images having known gaze angle difference therebetween. For example, first images of pairs in the training set and second images of the pairs may have a known gaze angle difference therebetween. During training, the training set images may be cropped to eye regions and the eye regions may be aligned to provide pairs of training eye region images. Based on the pairs of training eye region images, a likelihood map may be generated for each pixel of each of the first images of the pairs of training eye region images such that the likelihood map includes a sum of absolute differences (SAD) for each of multiple candidate motion vectors corresponding to the pixel. For example, for a particular pixel of an eye region of a first image, candidate motion vectors may be defined and a sum of absolute differences may be determined for each of the candidate motion vectors by comparing pixels around the particular pixel (e.g., a window) with a window in the eye region of the second image offset by the corresponding motion vector.

Furthermore, training stage compressed features may be determined for the first images of the pairs of training eye region images (e.g., via encoding by a neural network). The pretrained neural network may be trained based on the encode (to generate the training stage compressed features), a decode of the training stage compressed features to generate resultant first images corresponding to the first images, and a scoring of the first images and the resultant first images. For example, the pretrained neural network may be trained to generate compressed features that may provide for resultant images during decoding that attempt to match the images provided to the neural network. The scoring of the first images and the resultant first images may include evaluation of an error between the first images and the resultant first images, vertically filtering the first images and the resultant first images to generate vertically filtered first images and vertically filtered resultant first images, respectively, and determining an error between the vertically filtered first images and the vertically filtered resultant first images, or both. For example, the training of the neural network may reduce or minimize such errors.

Based on the likelihood maps and the compressed features (e.g., as determined by the encode portion of the neural network) for the eye regions in the training set, the pretrained classifier may be trained such that the pretrained classifier determines an optimal motion vector field based on the feature set during the implementation phase. As discussed, the pretrained classifier may be a pretrained random forest classifier. In such embodiments, each leaf of the tree of the random forest classifier may represent a likelihood map (e.g., a SAD map) for every pixel in the eye region and, at each branch of the tree, the training process may minimize the entropy between the likelihood maps that have arrived at the branch. The random forest classifier may include any suitable characteristics. In some embodiments, the random forest classifier may have about 4 to 8 trees having about 6 to 7 levels each.

As discussed, during the implementation phase, compressed features may be determined for an eye region of a source image and the pretrained classifier may be applied to the eye region to generate a motion vector field corresponding to the eye region. The motion vector field may be used to warp the eye region and the warped eye region may be integrated into the source image to generate an eye contact corrected image.

FIG. 1 illustrates an example setting 100 for providing eye contact correction, arranged in accordance with at least some implementations of the present disclosure. As shown, setting 100 may include a device 101 having a display 102 and a camera 104 operated by a user (not shown) to have a videotelephony session with a remote user 103. In the example of FIG. 1, device 101 is illustrated as a laptop computer. However, device 101 may include any suitable form factor device having display 102 and camera 104. For example, device 101 may be a camera, a smartphone, an ultrabook, a tablet, a wearable device, a monitor, a desktop computer, or the like. Furthermore, although discussed with respect to videotelephony or video conferencing, the discussed eye contact correction techniques may be provided in any suitable context.

During videotelephony or the like, images and/or video of the user of device 101 may be captured by camera 104 and, as shown, remote user 103 may be presented by display 102. During videotelephony, the user of device 101 may desire to look at a location 105 of remote user 103 (e.g., such that location 105 corresponds to the eyes of remote user 103) while images are being captured by camera 104. As shown, location 105 and camera 104 may have an offset 106 therebetween. As discussed, it may be desirable to alter the images and/or video of the user (not shown) as captured by camera 104 such that eye regions of the captured images and/or video frames may be warped to appear to look at or gaze upon camera 104. In the illustrated example, offset 106 is a vertical offset between camera 104 mounted above display 102. However, camera 104 and display 102 may have any relative position therebetween. For example, the relative position between camera 104 and display 102 may be a vertical offset with camera above display (as shown), a vertical offset with camera below display, a horizontal offset with camera left of display, a horizontal offset with camera right of display, or any diagonal offset between camera and display (e.g., camera above and to the right of display) with the camera fully outside of the boundary of the display or within a boundary in one direction (e.g., camera 104 may be moved from a central position of display 102 to a position off center but still within an edge of display 102).

Figure 2:
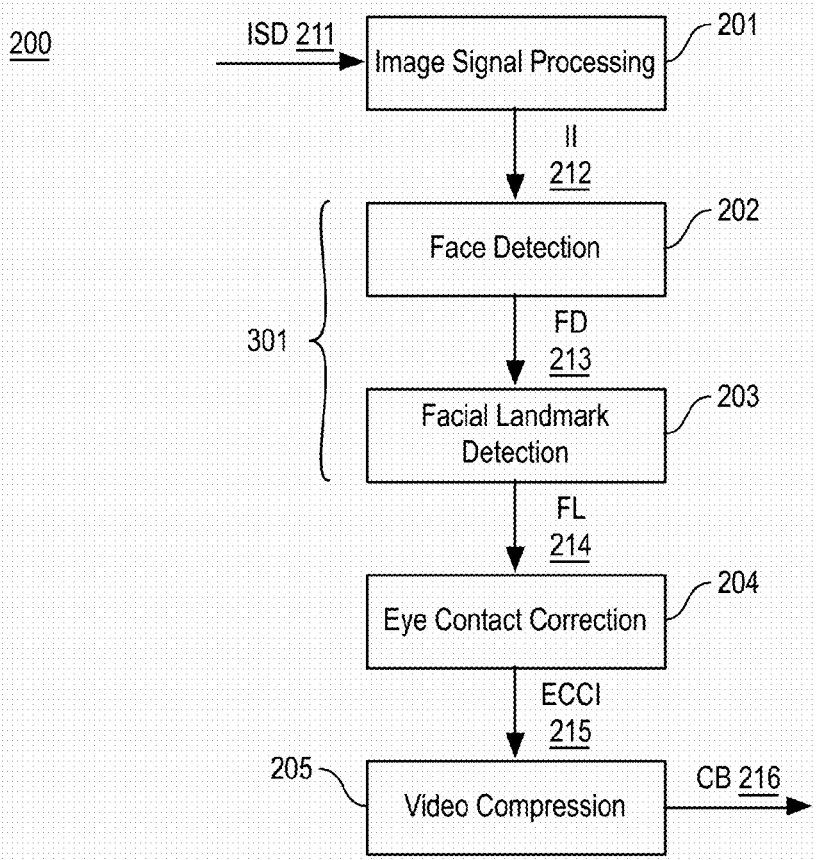
FIG. 2 illustrates an example system for providing eye contact correction.
Figure 3:
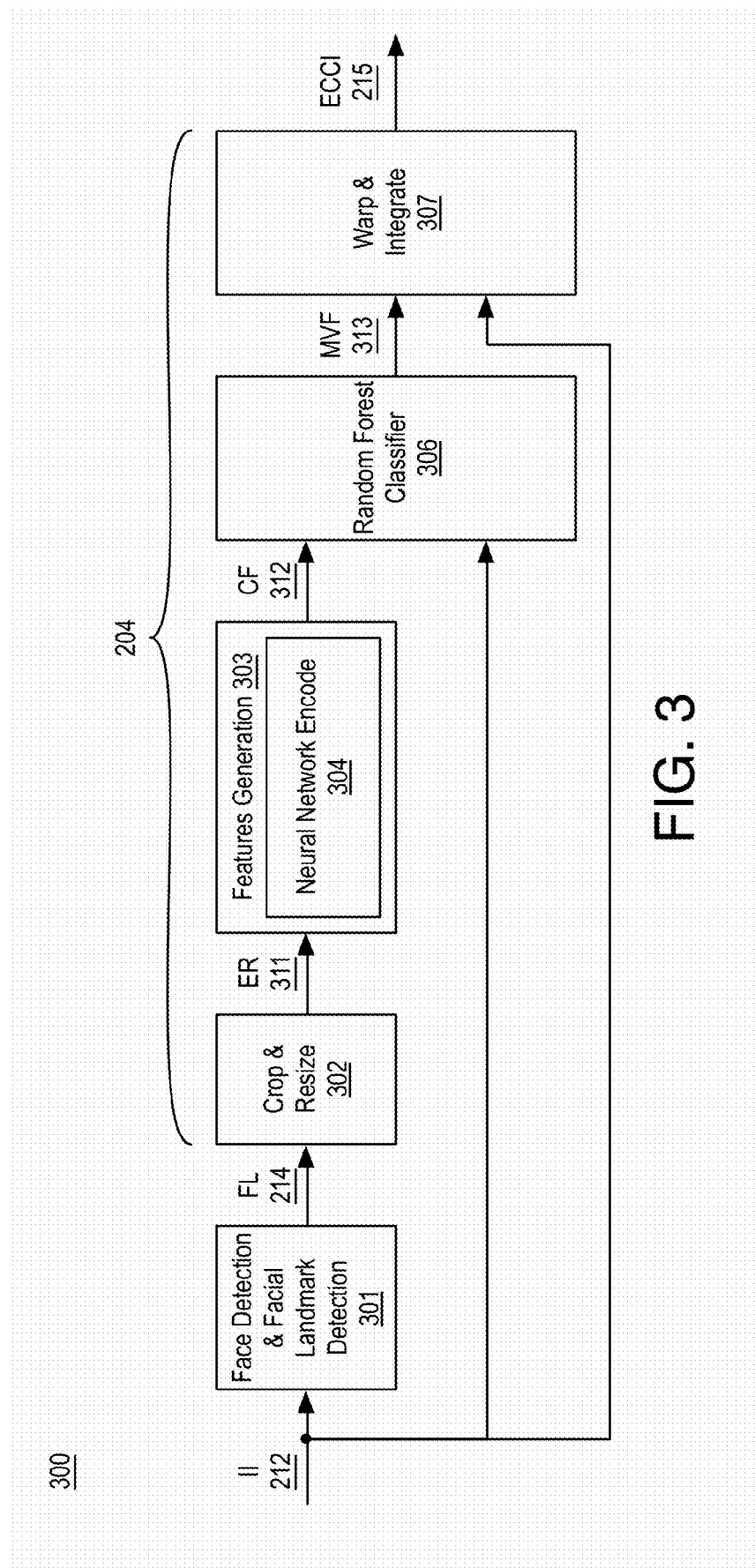
FIG. 3 illustrates an example eye contact correction module for providing eye contact correction.

FIG. 2 illustrates an example system 200 for providing eye contact correction, arranged in accordance with at least some implementations of the present disclosure. As shown in FIG. 2, system 200 may include an image signal processing module 201, a face detection module 202, a facial landmark detection module 203, an eye contact correction module 204, and a video compression module 205. As shown, in some embodiments, face detection module 202 and facial landmark detection module 203 may be part of a face detection and facial landmark detection module 301 (as illustrated in FIG. 3), which may provide face detection and facial landmark detection. System 200 may be implemented via any suitable device such as device 101 and/or, for example, a personal computer, a laptop computer, a tablet, a phablet, a smart phone, a digital camera, a gaming console, a wearable device, a display device, an all-in-one device, a two-in-one device, or the like. For example, system 200 may provide an image signal processing pipeline that may be implemented in hardware, software, or a combination thereof. As discussed, system 200 may provide for eye contact (or gaze) correction for videotelephony, video conferencing, or the like in real time to obtain natural looking corrected images and/or video. System 200 may use known scene geometry (e.g., relative positioning of camera 104 and display 102 as discussed with respect to FIG. 1) and neural network based machine learning techniques to provide real time, high quality eye contact correction.

As shown, image signal processing module 201 may receive image source data (ISD) 211. Image source data 211 may include any suitable image data such as image data from an image sensor (not shown) or the like. Image signal processing module 201 may process image source data 211 to generate input image (II) 212. Image signal processing module 201 may process image source data 211 using suitable technique or techniques such as demosaicing, gamma correction, color correction, image enhancement, or the like to generate input image 212. Input image 212 may be in any suitable color space and may include any suitable image data. As used herein, the term image may include any suitable image data in any suitable context. For example, an image may be a stand-alone image, an image of a video sequence of images, a frame of video or the like. Input image 212 may be characterized as a source image, an image, a frame, a source frame, or the like.

Input image 212 may be provided to face detection module 202, which may determine whether input image 212 has any faces and, if so, determine the location of such faces. Face detection module 202 may perform such face detection using any suitable technique or techniques to generate face detection data (FD) 213, which may include any suitable data or data structure representing one or more faces in input image 212. For example, face detection data 213 may provide the location and size of a boundary box corresponding to a face detected in input image 212. Face detection data 213 and/or input image 212 or portions thereof may be provided to facial landmark detection module 203, which may determine facial landmarks corresponding to the face or faces detected by to face detection module 202. Facial landmark detection module 203 may determine such facial landmarks (e.g., landmarks corresponding to eyes, a nose, a mouth, etc.) using any suitable technique or techniques to generate facial landmarks (FL) 214, which may include any suitable data or data structure representing facial landmarks within input image 212. For example, facial landmarks 214 may include locations of facial landmarks and a corresponding descriptor (e.g., the face part to which the landmark corresponds) for the facial landmarks.

As shown, facial landmarks 214 and/or input image 212 or portions thereof may be provided to eye contact correction module 204, which may generate an eye contact corrected image (ECCI) 215 corresponding to input image 212. Eye contact correction module 204 may generate eye contact corrected image 215 using techniques discussed further herein with respect to FIG. 3. As shown, eye contact corrected image 215 or a sequence of eye contact corrected images may be provided to video compression module 205, which may provide image and/or video compression to eye contact corrected image 215 or a sequence of eye contact corrected images to generate compressed bitstream (CB) 216. Video compression module 205 may generate compressed bitstream 216 using any suitable technique or techniques such as video encode techniques. In some examples, compressed bitstream 216 may be a standards compliant bitstream. For example, compressed bitstream 216 may be compliant with the H.264/MPEG-4 Advanced Video Coding (AVC) standard, the High Efficiency Video Coding (HEVC) standard, or the like. Compressed bitstream 216 may be transmitted to a remote device (e.g., a device remote to device 101 as discussed with respect to FIG. 1) for presentment to a user of the remote device. For example, compressed bitstream 216 may be packetized and transmitted to the remote device, which may re-assemble compressed bitstream 216 and decode compressed bitstream 216 to generate image(s) for presentment to the user of the remote device.

FIG. 3 illustrates an example eye contact correction module 204 for providing eye contact correction, arranged in accordance with at least some implementations of the present disclosure. As shown in FIG. 2, eye contact correction module 204 may be provided as a portion of system 200 to provide eye contact correction. As shown in FIG. 3, input image 212 may be received by face detection and facial landmark detection module 301, which as discussed with respect to FIG. 2 may include face detection module 202 and facial landmark detection module 203. As shown, face detection and facial landmark detection module 301 may receive input image 212 and face detection and facial landmark detection module 301 may provide facial landmarks 214 as discussed herein. As shown in FIG. 3, eye contact correction module 204 may include a crop and resize module 302, a features generation module 303 that may include a neural network encode module 304, a random forest classifier 306, and a warp and integrate module 307. For example, eye contact correction module 204 may receive facial landmarks 214 and input image 212 and eye contact correction module 204 may generate eye contact corrected image 215.

Figure 4:
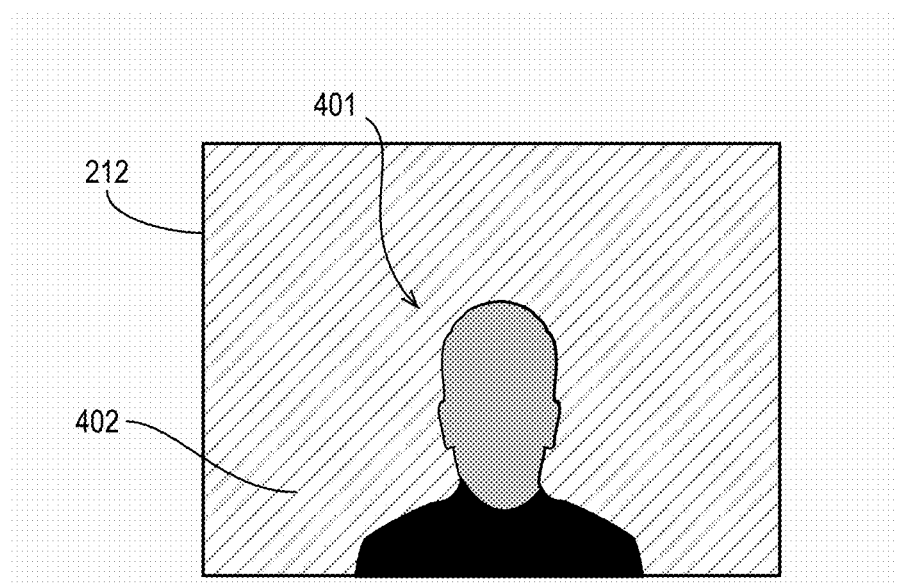
FIG. 4 illustrates an example input image.

FIG. 4 illustrates an example input image 212, arranged in accordance with at least some implementations of the present disclosure. As shown in FIG. 4, input image 212 may include a user 401 and a background 402. For example, image source data 211 may be captured by camera 104 and image source data 211 may be processed by image signal processing module 201 to generate input image 212. Although not shown in FIG. 4, user 401 may have eyes having an unnatural gaze such that instead of looking at camera 104, user 401 is looking at display 102 (please refer to FIG. 1), which may give the appearance of user 401, if received by a remote user, as looking down and away instead of at the remote user (please refer to FIG. 6).

Returning to FIG. 3, input image 212 may be received by face detection and facial landmark detection module 301, which as discussed, may provide face detection and facial landmark detection using any suitable technique or techniques.

Figure 5:
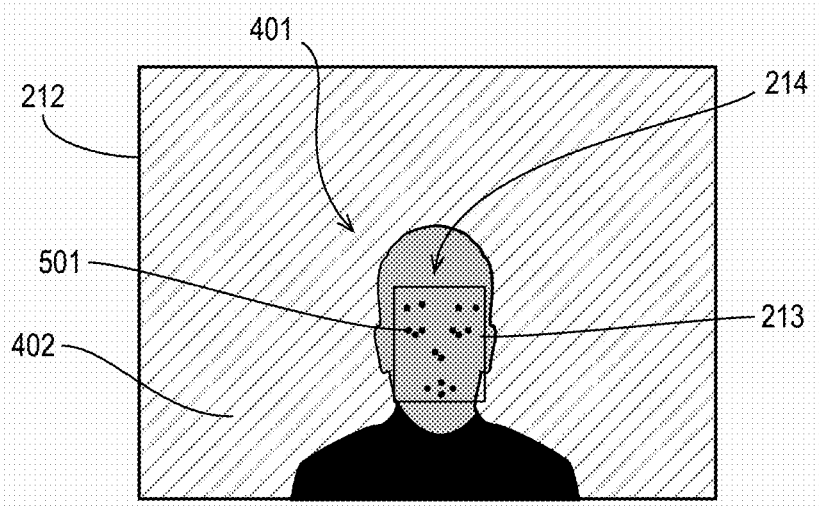
FIG. 5 illustrates example face detection data and example facial landmarks.

FIG. 5 illustrates example face detection data 213 and example facial landmarks 214, arranged in accordance with at least some implementations of the present disclosure. As shown in FIG. 5, face detection and facial landmark detection module 301 may provide face detection to generate face detection data 213, which may provide a boundary box or the like around a detected face region of user 401. Furthermore, face detection and facial landmark detection module 301 may provide facial landmarks 214, which may provide locations and, optionally, corresponding descriptors for detected facial landmarks of user 401. For example, facial landmarks 214 may include eye landmarks 501 characterized by locations within input image 212 and a descriptor or the like indicating they correspond to a detected eye of user 401.

Returning again to FIG. 3, as shown, crop and resize module 302 may receive facial landmarks 214 and input image 212 and crop and resize module 302 may generate eye regions 311 using any suitable technique or techniques. For example, input image 212 may be cropped to generate one or more eye regions 311 such that eye regions 311 include all or most eye landmarks corresponding to a detected eye and, optionally, a buffer region around the outer most eye landmarks in the horizontal and vertical directions. In an embodiment, crop and resize module 302 may crop input image 212 such that eye regions 311 each have a fixed (e.g., predetermined) size.

Figure 6:
FIG. 6 illustrates an example eye region.

FIG. 6 illustrates an example eye region 311, arranged in accordance with at least some implementations of the present disclosure. As shown in FIG. 6, eye region 311 may be a cropped portion of input image 212 including an eye of user 401. Also, as shown, eye region 311 may include a user eye that, if received by a remote user would not make eye contact with the remote user (as may be expected).

Returning to FIG. 3, eye regions 311 may include any number of eye regions for any number of users. In an expected implementation, eye regions 311 may include two eye regions for a single user 401. However, eye regions 311 may include a single eye region, multiple eye regions corresponding to multiple users, or the like.

With continued reference to FIG. 3, features generation module 303 may receive eye regions 311 and features generation module 303 may generate compressed features (CF) 312 such that each set of compressed features of compressed features 312 corresponds to an eye region of eye regions 311 (e.g., each eye region may have corresponding compressed features). In an embodiment, features generation module 303 may include neural network encode module 304, which may generate or determine compressed features 312 for each eye region of eye regions 311. For example, compressed features 312 may be an output of an output layer of a neural network implemented by neural network encode module 304. Compressed features 312 may be characterized as a compressed feature set, a feature set, a middle layer output, a compressed feature vector, or the like. Neural network encode module 304 may be or implement a deep neural network, a convolutional neural network, or the like. In an embodiment, neural network encode module 304 may be or implement an encode portion of a neural network. In an embodiment, neural network encode module 304 may be or implement an auto encode neural network that encodes eye regions 311 to sets of compressed features.

Figure 7:
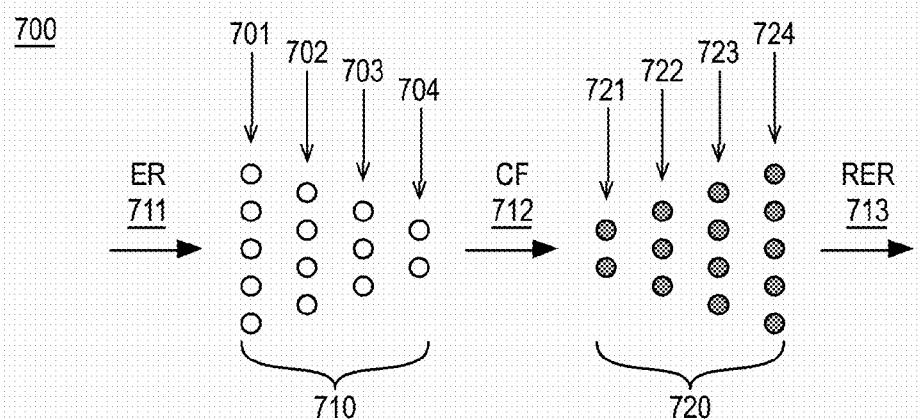
FIG. 7 illustrates an example neural network.

FIG. 7 illustrates an example neural network 700, arranged in accordance with at least some implementations of the present disclosure. As shown in FIG. 7, neural network 700 may include an encode portion 710 having layers 701-704 and a decode portion 720 having layers 721-724. Also as shown, neural network 700, via encode portion 710 may receive an eye region 711 and encode portion 710, via layers 701-704, may generate compressed features 712. Furthermore, decode portion 720 may receive compressed features 712 and decode portion 720, via layers 721-724, may generate a resultant eye region 713. For example, encode portion 710 and decode portion 720 may be trained in a training phase, as is discussed further herein, and encode portion 710 may be implemented in an implementation phase. For example, intermediary compressed features 712 may be used as compressed features for input into a classifier, which may generate a motion vector field based on the compressed features, as is discussed further with respect to FIG. 3.

Neural network 700 may include any suitable neural network such as an artificial neural network, a deep neural network, a convolutional neural network, or the like. As shown in FIG. 7, neural network 700 may include encode portion 710 having four layers 701-704 and decode portion 720 having four layers 721-724. However, encode portion 710 and decode portion 720 may have any suitable number of layers. Furthermore encode portion 710 and decode portion 720 may include fully connected layers, convolutional layers with max pooling, or a combination thereof. In an embodiment, encode portion 710 may have two fully connected layers and decode portion 720 may have two fully connected layers. In an embodiment, encode portion 710 may have four fully connected layers and decode portion 720 may have four fully connected layers. In an embodiment, encode portion 710 may have six fully connected layers and decode portion 720 may have six fully connected layers. In an embodiment, encode portion 710 may have four layers with a convolutional layer with max pooling followed by three fully connected layers and decode portion 720 may have four fully connected layers. In an embodiment, encode portion 710 may have two convolutional layers with max pooling followed by two fully connected layers and decode portion 720 may have four fully connected layers. However, as discussed, any suitable combination may be provided. Furthermore, such characteristics of neural network 700 are discussed further herein with respect to training neural network 700.

Returning to FIG. 3, neural network encode module 304 may implement encode portion 710 of neural network 700. Neural network encode module 304 may implement encode portion 710 of neural network 700 using any suitable technique or techniques such that neural network encode module 304 may generate compressed features 312 based on eye region 311. Compressed features 312 may be generated using any suitable technique or techniques. For example, eye regions 311 of 50×60 pixels may provide 3,000 input nodes to neural network encode module 304, which may implement a neural network encoder to generate compressed features 312, which may include any number of features such as about 30 to 150 features or the like. In an embodiment, compressed features 312 include about 100 features or parameters. For example, in the context of eye regions 311 having 50×60 pixels and compressed features 312 having about 100 features, a 30:1 compression may be provided. Furthermore, although not provided via system 300, such 100 features in the context of decode portion 720 (please refer to FIG. 7) may provide resultant eye region 713 maintaining image integrity and quality with respect to eye region 711.

As shown, compressed features 312 and input image 212 may be received by random forest classifier 306. As discussed further herein, random forest classifier 306 may be a pretrained classifier that applies the pretrained classifier to a compressed feature set of compressed features 312 to generate a corresponding (and optimal) motion vector field 313. Although illustrated with respect to random forest classifier 306, any suitable pretrained classifier may be applied such as, for example, a decision tree learning model, a kernel random forest model, or the like. Random forest classifier 306 may receive compressed features 312 and, for each feature set of compressed features 312, apply random forest classifier 306 such that the set of compressed features traverses branches of the forest based on decisions at each branch until a leaf is reached such that the leaf corresponds to or provides a motion vector field for the compressed features. For example, motion vector fields 313 may include a motion vector field for each feature set of compressed features of compressed features 312 based on application of random forest classifier 306 to each feature set.

Motion vector fields 313 and input image 212 may be received by warp and integrate module 307, which may warp eye regions 311 based on motion vector fields 313 and integrate the warped eye region or regions into input image 212. For example, motion vector fields 313 may be applied to eye regions 311 by determining, for each pixel location of eye regions 311 a warped pixel value as a pixel value corresponding to pixel value as indicated by the motion vector for that pixel. The warped eye regions may then replace eye regions 311 in input image 212 (e.g., the warped eye regions may be integrated into the remaining portion of input image 212) to generate eye contact corrected image 215.

Figure 8:
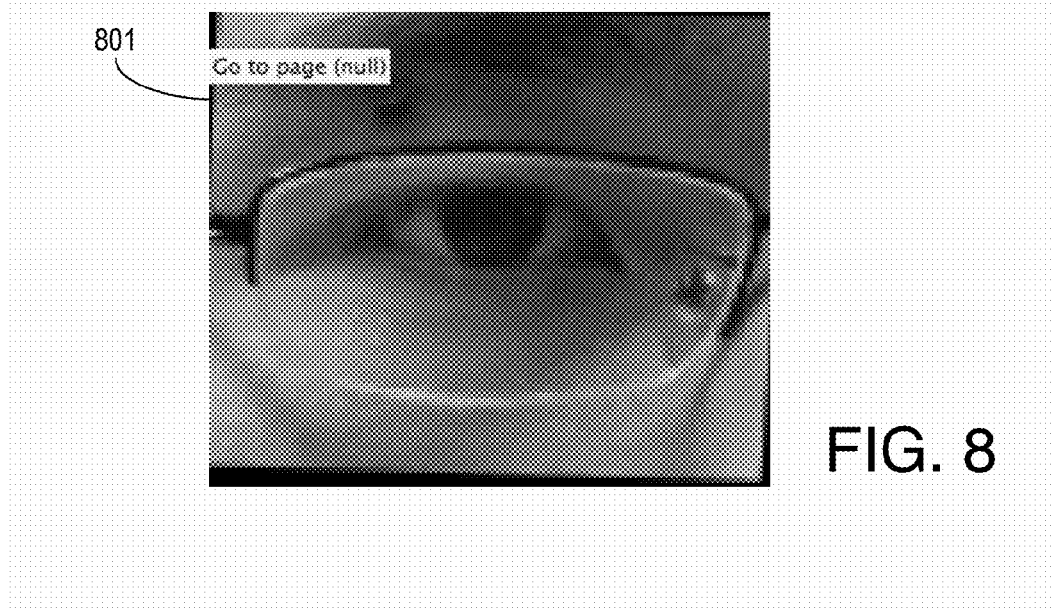
FIG. 8 illustrates an example corrected eye region.

FIG. 8 illustrates an example corrected eye region 801, arranged in accordance with at least some implementations of the present disclosure. As shown in FIG. 8, corrected eye region 801 may have a corrected gaze with respect to eye region 311 of FIG. 6 such that the gaze appears to be looking at recipient of corrected eye region 801. As discussed, corrected eye region 801 (e.g., a warped eye region) may be integrated into a final eye corrected image, which may be encoded and transmitted to a remote user for presentment.

Returning to FIG. 3, any number of eye contact corrected images 215 may be generated such as a video sequence of eye contact corrected images 215. The techniques discussed herein may provide for high quality eye contact correction in real time. For example, the discussed processing as performed by system 200 may be performed at a rate such that videotelephony, video conferencing, or the like may be performed in real time between users.

With reference to FIG. 1, a user of device 101 (not shown) and user 103 at a remote device (not shown) may experience a videotelephony application, a video conferencing application, or the like that compensates for offset 106 between location 105 and camera 104 by adjusting the gaze of either or both users. Furthermore, with respect to device 101, features generation module 303 and/or random forest classifier 306 may rely on pretraining based on offset 106. For example, as discussed further below, training images used to train neural network encode module 304 and/or random forest classifier 306 may be selected such that they match or closely approximate offset 106. For example, if offset 106 provides an approximate offset of 10° (e.g., a 10° angle between line from a user's eyes to location 105 and a second line from the user's eyes to camera 104), training images having an approximate offset of 10° may be used to neural network encode module 304 and/or random forest classifier 306.

Furthermore, with further reference to system 200, system 200 includes a single eye contact correction module 204 trained for a single orientation or relative position between camera 104 and display 102. In other embodiments, system 200 may include multiple contact correction modules or contact correction module 204 may be capable of implementing eye contact correction for multiple orientations or relative positions between camera 104 and display 102. For example, device 101 may include a second camera (not shown) or a capability to relocate camera 104 with respect to display 102. In an embodiment, system 200 may include a first eye contact correction module for a first relative position between camera 104 and display 102 and a second eye contact correction module for a second relative position between camera 104 and display 102. In an embodiment, system 200 may include multiple eye contact correction modules for multiple relative positions between camera 104 and display 102. For example, each eye contact correction module may have a different pretrained neural network encode module 304 and/or random forest classifier 306. In other examples, a single eye contact correction module may implement (e.g., via loading from memory) different predetermined variables or data structures to provide multiple eye contact corrections each corresponding to different relative positions between camera 104 and display 102. For example, neural network encode module 304 may implement different pretrained neural network encoders responsive to or selectively based on camera 104 and display 102 having a particular relative position therebetween. In addition or in the alternative, random forest classifier 306 may apply different random forest models responsive to or selectively based on camera 104 and display 102 having a particular relative position therebetween.

For example, encoding an eye region of a source image, by a pretrained neural network, and applying the pretrained classifier to compressed features 312 to determine motion vector field 313 for eye region 311 of input image 212 as discussed above may be selectively provided based on camera 104 and display 102 having a first relative position therebetween (e.g., camera 104 being above display 102 to provide an offset 106). When camera 104 and display 102 have a second relative position therebetween (e.g., camera 104 below, left of, right of, further above, diagonal to display 102, or the like), the compressed features may be generated (e.g., by neural network encode module 304 or another neural network encoder module) to second compressed features (not shown), a second pretrained classifier may be applied (e.g., by random forest classifier 306 or another pretrained classifier such as another random forest classifier) to the second compressed features to determine a second motion vector field (not shown). The second motion vector field may be used to warp the eye region of input image 212 and the warped eye region may be integrated into input image to generate eye contact corrected image 215. For example, such techniques may provide for the application of different pretrained models as an orientation or relative position between camera 104 and display 102 may change.

As discussed, various components or modules of system 200 may be pretrained in a training phase prior to deployment in an implementation phase.

Figure 9:
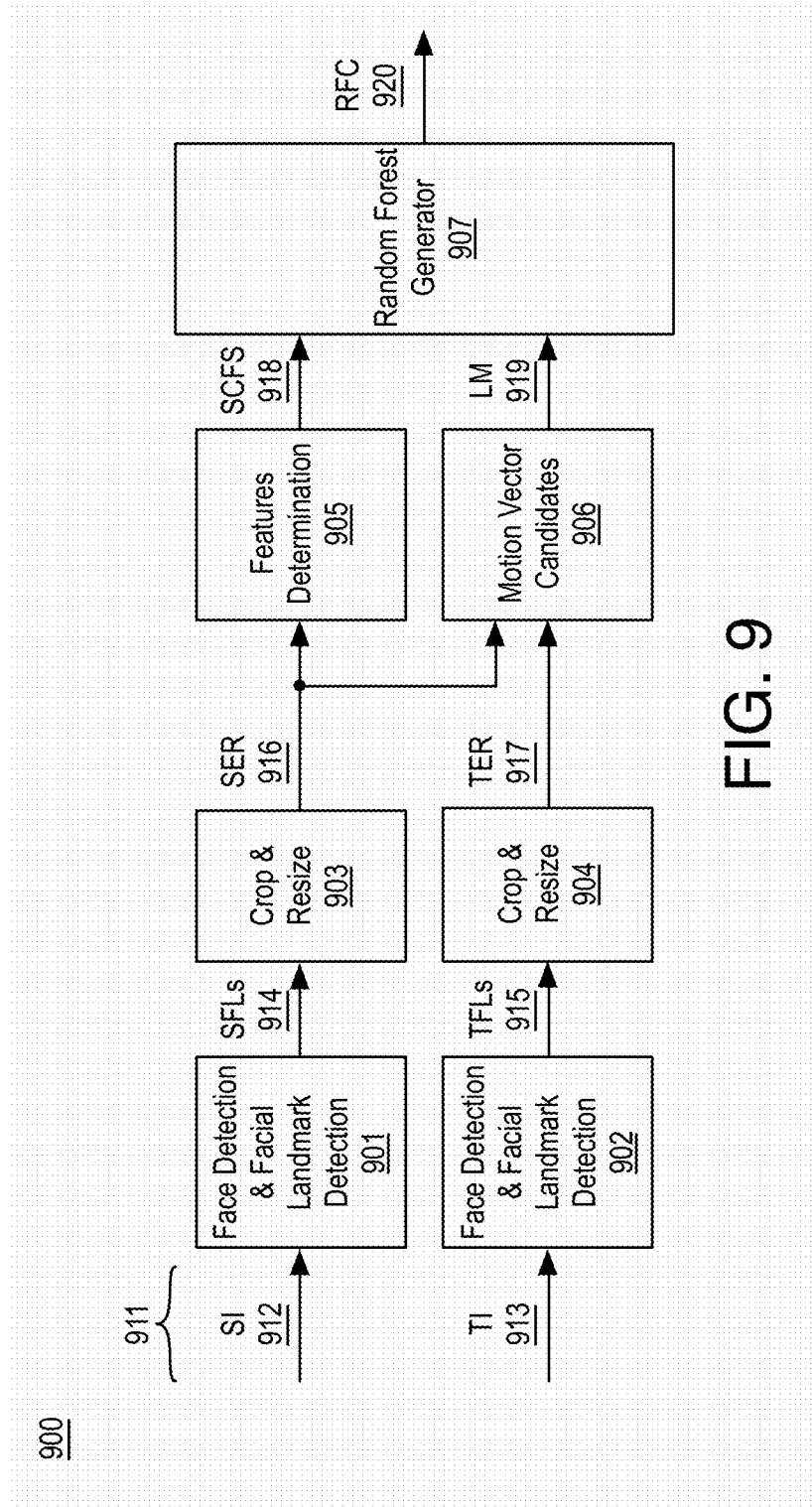
FIG. 9 illustrates an example system for pretraining an eye contact correction classifier.

FIG. 9 illustrates an example system 900 for pretraining an eye contact correction classifier, arranged in accordance with at least some implementations of the present disclosure. As shown in FIG. 9, system 900 may include a face detection and facial landmark detection module 901, a face detection and facial landmark detection module 902, a crop and resize module 903, a crop and resize module 904, a features determination module 905, a motion vector candidates module 906, and a random forest generator module 907. As shown, in some embodiments, face detection and facial landmark detection modules 901, 902 and crop and resize modules 903, 904 may be provided separately. In other examples, face detection and facial landmark detection modules 901, 902 and/or crop and resize modules 903, 904 may be provided together as a single face detection and facial landmark detection modules and/or a single crop and resize module. System 900 may be implemented via any suitable device such as device 101 and/or, for example, a personal computer, a laptop computer, a tablet, a phablet, a smart phone, a digital camera, a gaming console, a wearable device, a display device, an all-in-one device, a two-in-one device, or the like. Systems 900 and 200 may be provided separately or they may be provided together.

As shown, system 900 may receive training images 911 such that training images include pairs of source images 912 and target images 913. For example, each pair of training images 911 may include a source image and a corresponding target image such that the source and target images have a known gaze angle difference therebetween. System 900 may be used to generate a random forest classifier 920 for any number of sets of training images 911 having any suitable gaze angle difference therebetween.

Figure 10:
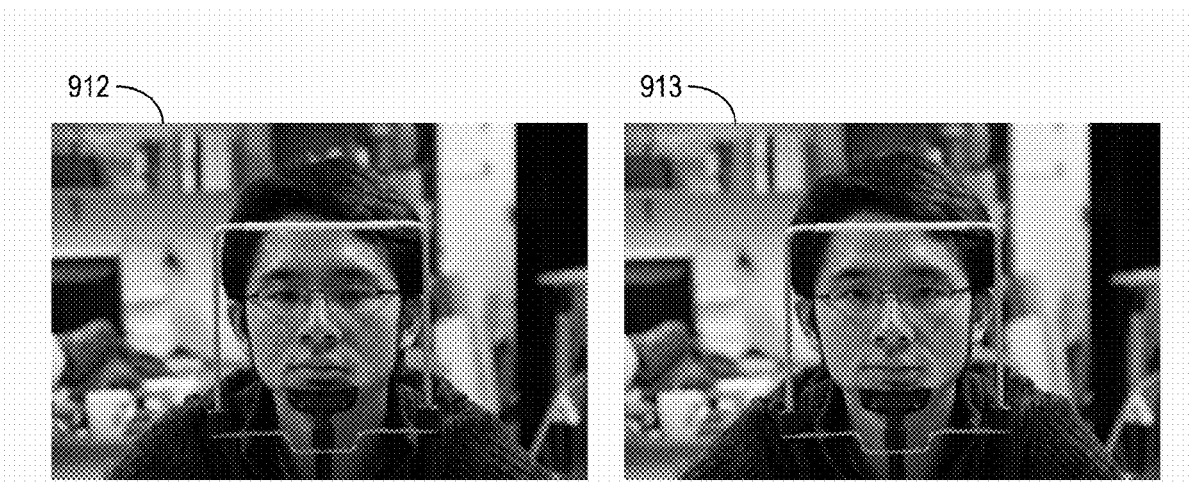
FIG. 10 illustrates an example source image and an example target image.

FIG. 10 illustrates an example source image 912 and an example target image 913, arranged in accordance with at least some implementations of the present disclosure. As shown in FIG. 9, source image 912 may include an image of a user looking in a downward direction with respect to a camera attaining source image 912 and target image 913 may include an image of the user looking at the camera. In the example of FIG. 10, source image 912 and target image 913 have approximately a 10° gaze angle difference (e.g., a 10° vertical gaze angle difference or offset).

Returning to FIG. 9, source images 912 and target images 913 may include any number of pairs of training images in analogy to those illustrated in FIG. 10. As shown, source images 912 may be received by face detection and facial landmark detection module 901, which may provide source facial landmarks (SFL) 914. Similarly, target images 913 may be received by face detection and facial landmark detection module 902, which may provide target facial landmarks (TFL) 915. Face detection and facial landmark detection modules 901, 902 may operate as discussed with respect to face detection and facial landmark detection module 301 (please refer to FIG. 3). Such discussion will not be repeated for the sake of brevity.

Figure 11:
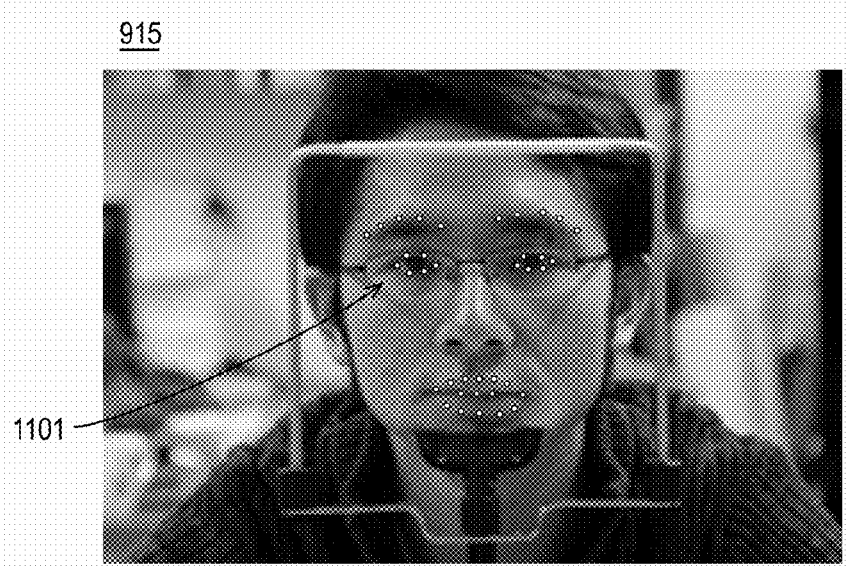
FIG. 11 illustrates example target facial landmarks.

FIG. 11 illustrates example target facial landmarks 915, arranged in accordance with at least some implementations of the present disclosure. As shown in FIG. 11, target facial landmarks 915 may include eye landmarks 1101. Eye landmarks 1100 may be generated using any suitable technique or techniques and may be characterized by a location within an image and/or descriptors corresponding to eye landmarks 1100 (e.g., a descriptor of eye, left eye, or the like). In the example of FIG. 11, target facial landmarks 915 corresponding to target image 913 are illustrated. As discussed, source facial landmarks 914 corresponding to source image 912 may also be determined.

Again returning to FIG. 9, source images 912 and source facial landmarks 914 may be received by crop and resize module 903, which may provide source eye regions (SER) 916. Similarly, target images 913 and target facial landmarks 915 may be received by crop and resize module 903, which may provide target eye regions (TER) 917. Crop and resize modules 903, 904 may operate as discussed with respect to crop and resize module 302 (please refer to FIG. 3). Such discussion will not be repeated for the sake of brevity.

Figure 12:
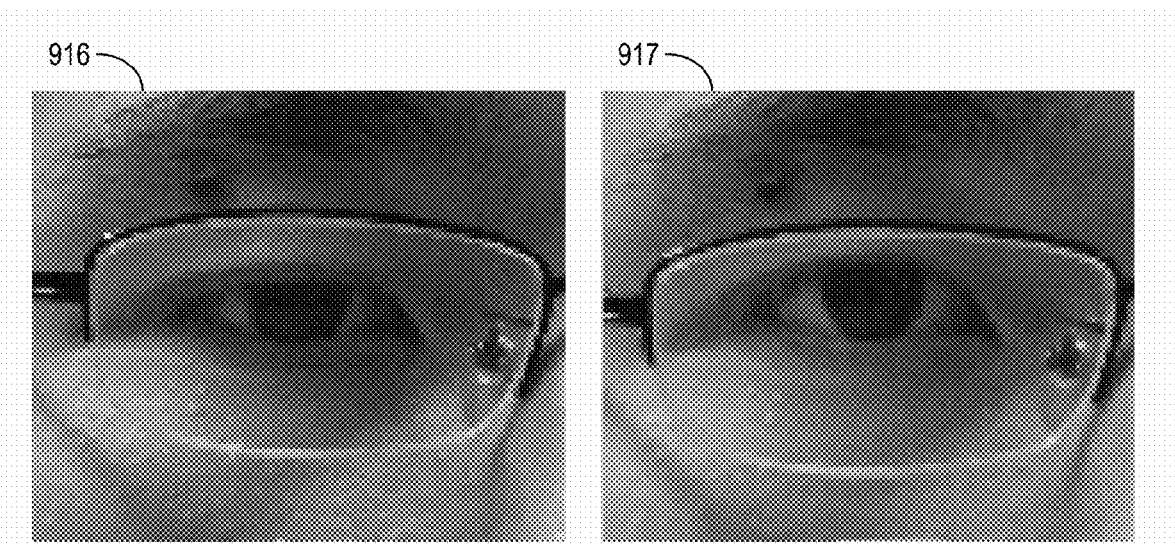
FIG. 12 illustrates an example source eye region and an example target eye region.

FIG. 12 illustrates an example source eye region 916 and an example target eye region 917, arranged in accordance with at least some implementations of the present disclosure. As shown in FIG. 12, eye regions 916, 917 may be cropped portions of source image 912 and target image 913, respectively. Furthermore, eye region 916 may include a user eye having a downward gaze and eye region 917 may include the user eye having a forward or straight ahead gaze.

Returning to FIG. 9, in addition to cropping and resizing, system 900 may align source eye regions 916 and target eye regions 917. For example, the alignment may include an affine transform to compensate for head movement between the corresponding source image 912 and target image 913.

As shown, source eye regions 916 and target eye regions 917 may be provided to motion vector candidates module 906. Motion vector candidates module 906 may determine likelihood maps (LM) 919 based on source eye regions 916 and target eye regions 917. For example, for each pixel location of source eye regions 916, multiple candidate motion vectors may be evaluated by determining a sum of absolute differences between a window around the pixel in source eye region 816 and a motion vector shifted window in target eye region 917. For example, the window or evaluation block may have a size of 6×6 pixels over a search range of 10×10 pixels at fixed intervals such as every pixel. Although discussed with respect to 6×6 pixel windows searched over a search range of 10×10 pixels at every pixel, any pixel window size, search range, and interval may be used.

For example, motion vector candidates module 906 may generate a very large data set of likelihood maps that provide candidate motion vectors or inverse probabilities. For example, lower sum of absolute differences may correlate to higher probability the optimal motion vector of the candidate motion vectors has been found. For example, the lower the sum of absolute differences at a specific shift (e.g., as provided by the corresponding motion vector), the closer or more likely the true best motion vector corresponds to that shift. The sum of absolute differences maps (e.g., likelihood maps 919) may be aggregated over all blocks in the aligned source eye regions 916 and target eye regions 917 pairs and all source images 912 and target images pairs 913 in training images 911

Figure 13:
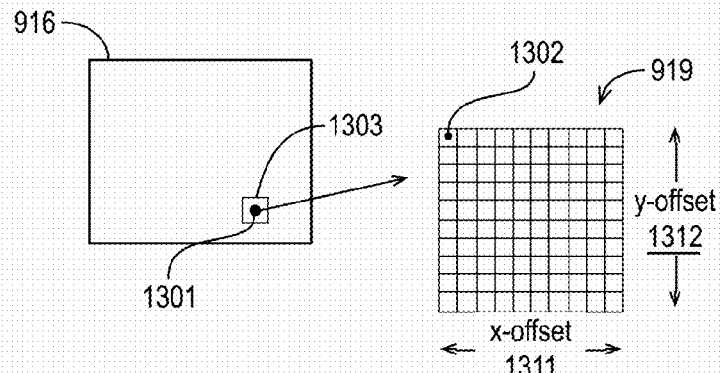
FIG. 13 illustrates an example likelihood map for an example source eye region.

FIG. 13 illustrates an example likelihood map 919 for an example source eye region 916, arranged in accordance with at least some implementations of the present disclosure. As shown in FIG. 13, for a pixel 1301 of source eye region 916, likelihood map 919 may be generated such that for an entry 1302 of likelihood map 919, a sum of absolute differences or similar measure of similarity may be determined between a window 1303 around pixel 1301 and multiple windows (not shown) in corresponding target eye region 917 (not shown). For example, entry 1302 may correspond to a comparison of window 1303 and a window in target eye region 917 at maximum negative x-offset 1311 and a maximum positive y-offset 1312 (e.g., corresponding to a motion vector with a maximum negative x-offset 1311 and a maximum positive y-offset 1312) with respect to pixel 1301. For each combination of x-offsets 1311 and y-offsets 1312, a corresponding entry in likelihood map 919 may be determined as a sum of absolute differences or similar measure of similarity. Furthermore, as discussed, a likelihood map may be generated for each pixel location of source eye region 916 and, further still, for each source eye region of source eye regions 916.

Returning to FIG. 9, features determination module 905 may receive source eye regions 916 and features determination module 905 may determine source compressed feature sets (SCFS) 918 based on source eye regions 916. For example, features determination module 905 may generate compressed features based on application of an encode portion of a neural network. For example, with reference to FIG. 7, source compressed feature sets 918 may be generated by encode portion 710 of neural network 700 as implemented by features determination module 905 and the resultant compressed feature sets 918 (e.g., each set corresponding to an eye region of source eye regions 916 may be provided to random forest generator module 907. For example, the same encode portion 710 of neural network 700 (e.g., having the same architecture, features, parameters, etc.) may be implemented in the training phase and in the implementation phase. Furthermore, as discussed, neural network 700 as implemented by features determination module 905 may have any suitable architecture and features.

As discussed, in some examples, for source eye regions 916 of 50×60 pixels may be provided to features determination module 905 and source compressed feature sets 918 may each have 100 features, although any size of eye regions 916 and number of features may be used. Example neural network architectures and training techniques are discussed further herein. It is to be understood that any neural network architecture discussed with respect to training may be implemented in an implementation phase (e.g., as discussed with respect to neural network encode module 304 of FIG. 3.

Figure 14:
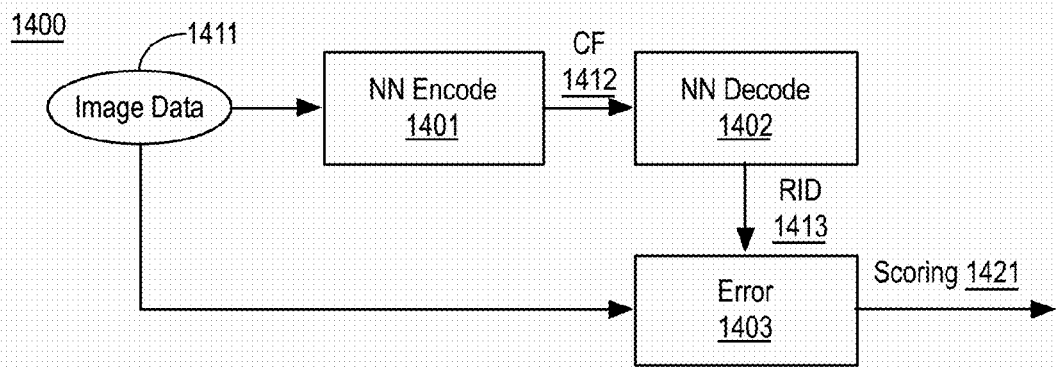
FIG. 14 illustrates an example neural network training system.

FIG. 14 illustrates an example neural network training system 1400, arranged in accordance with at least some implementations of the present disclosure. As shown in FIG. 14, neural network training system 1400 may include a neural network (NN) encode module 1401, a neural network decode module 1402, and an error module 1403. For example, neural network encode module 1401 may implement a neural network encode portion and neural network decode module 1402 may implement a neural network encode portion such that neural network encode module 1401 and neural network decode module 1402 implement a neural network encode-decode that receives an input image and provides a resultant image that may be compared to the input image. For example, the neural network may be trained to reduce the error between the input image provided to the neural network and the resultant image from the neural network. As discussed, a middle layer parameter set (e.g., compressed features) may be used to train a classifier and both the pretrained encode portion of the neural network and the pretrained classifier may be implemented during an implementation phase in real time to map from an input eye region to a motion vector field, which may be used to warp the eye region to provide eye contact or gaze correction.

As shown, neural network encode module 1401 may receive image data 1411, which may include any suitable image data such as eye regions, source images 911, target images 913, source eye regions 916, target eye regions 917, or the like. For example, image data 1411 may include any suitable corpus of input image data for training the neural network implemented by neural network encode module 1401 and neural network decode module 1402. In an embodiment, image data 1411 may include images of 54×54 pixels. In an embodiment, image data 1411 may include images of 54×66 pixels. Neural network encode module 1401 may receive image data 1411 and, for an image of image data 1411, neural network encode module 1401 may generate compressed features 1412. Compressed features 1412 may be generated by any suitable neural network encode portion and compressed features 1412 may include any number of features. For example, with reference to FIG. 7, neural network encode module 1401 may implement encode portion 710 to generate compressed features 1412 in analogy to compressed features 712.

Neural network decode module 1402 may receive compressed features 1412 and neural network decode module 1402 may generate resultant image data 1413 based on compressed features 1412. Resultant image data 1413 may be generated by any suitable neural network decode portion and resultant image data may correspond to an image of image data 1411. For example, the discussed processing may be performed for a large number of images of image data 1411 to generate a resultant image corresponding to each image. For example, with reference to FIG. 7, neural network decode module 1402 may implement decode portion 720 to generate resultant image data 1413 in analogy to resultant eye region 713.

As shown, image data 1411 and resultant image data 1413 may be provided to error module 1403. Error module 1403 may compare an image or images of image data 1411 with a resultant image or images of resultant image data 1413 to generate scoring 1421. Error module 1403 may generate scoring 1421 using any suitable technique or techniques and scoring 1421 may include any suitable scoring, error measurement, or the like. Scoring 1421 may be used to train the neural network implemented by neural network encode module 1401 and neural network decode module 1402 such that, for example, an error represented by scoring 1421 may be minimized. In an embodiment, scoring 1421 may be a Euclidian loss between images of image data 1411 and resultant images of resultant image data 1413. In an embodiment, scoring 1421 may be an L2 error between images of image data 1411 and resultant images of resultant image data 1413.

Figure 15:
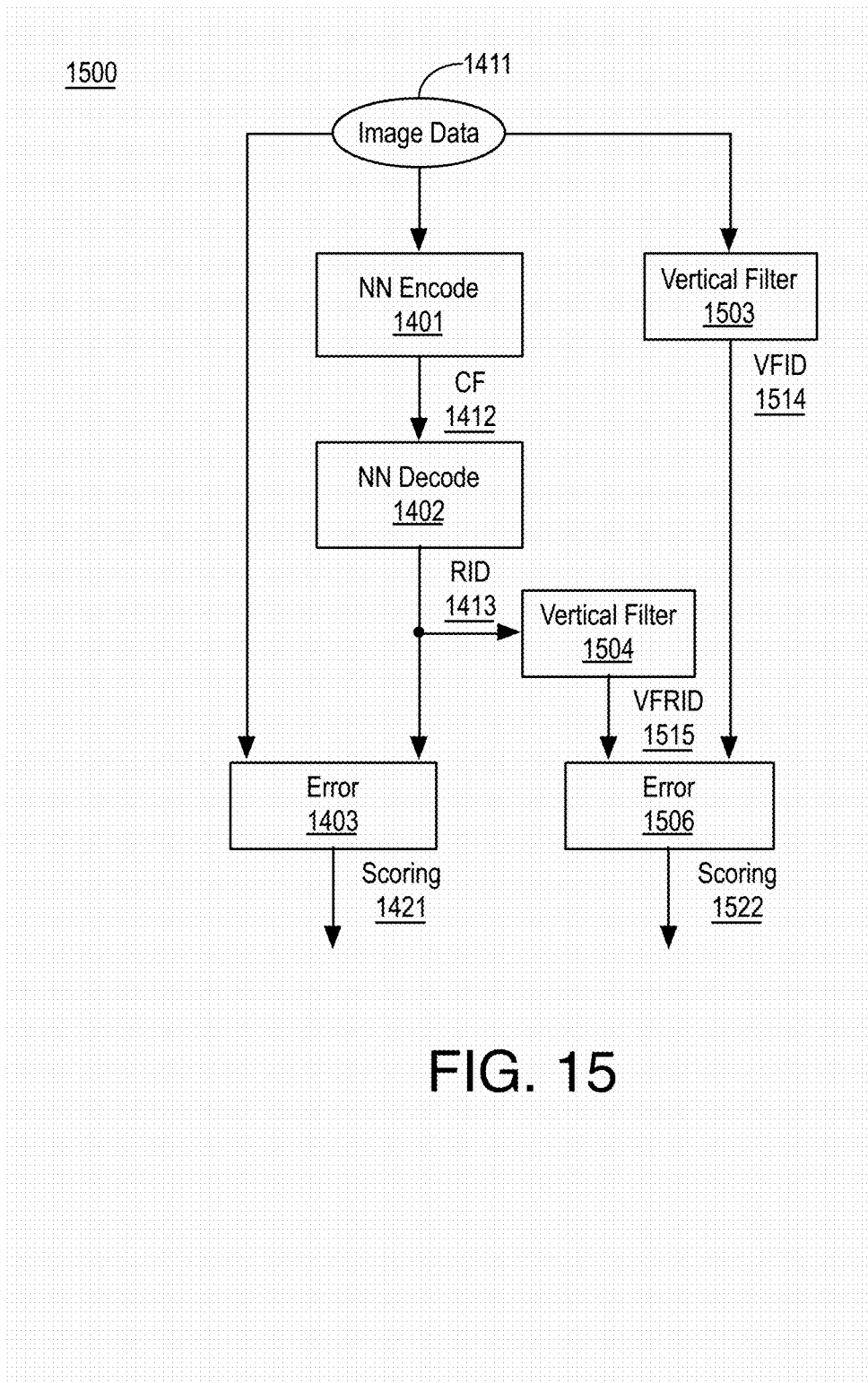
FIG. 15 illustrates an example neural network training system.

FIG. 15 illustrates an example neural network training system 1500, arranged in accordance with at least some implementations of the present disclosure. As shown in FIG. 15, neural network training system 1500 may include neural network encode module 1401, neural network decode module 1402, vertical filter modules 1503, 1504, and error modules 1403, 1506. As discussed, neural network encode module 1401 may implement a neural network encode portion and neural network decode module 1402 may implement a neural network encode portion such that neural network encode module 1401 and neural network decode module 1402 implement a neural network encode-decode that receives an input image and provides a resultant image that may be compared to the input image. For example, the neural network may be trained to reduce the error between the input image provided to the neural network and the resultant image from the neural network. As discussed, a middle layer parameter set (e.g., compressed features) may be used to train a classifier and both the pretrained encode portion of the neural network and the pretrained classifier may be implemented during an implementation phase in real time to map from an input eye region to a motion vector field, which may be used to warp the eye region to provide eye contact or gaze correction.

As shown, neural network encode module 1401 may receive image data 1411, which may include any suitable image data and neural network encode module 1401 may generate compressed features 1412 as discussed. Neural network decode module 1402 may receive compressed features 1412 and neural network decode module 1402 may generate resultant image data 1413 based on compressed features 1412 also as discussed.

As shown, image data 1411 and resultant image data 1413 may be provided to error module 1403, which may compare an image or images of image data 1411 with a resultant image or images of resultant image data 1413 to generate scoring 1421. As discussed, error module 1403 may generate scoring 1421 using any suitable technique or techniques and scoring 1421 may include any suitable scoring, error measurement, or the like such as a Euclidian loss or an L2 error between images of image data 1411 and resultant images of resultant image data 1413.

Also as shown, image data 1411 and resultant image data 1413 may be provided to vertical filter module 1503 and vertical filter module 1504, respectively. Vertical filter module 1503 may receive image data 1411 and vertical filter module 1503 may apply a vertical filter to image data 1411 to generate vertical filtered image data 1514. Similarly, vertical filter module 1504 may receive resultant image data 1413 and vertical filter module 1504 may apply a vertical filter to resultant image data 1413 to generate vertical filtered resultant image data 1515. In an embodiment, vertical filter modules 1503, 1504 may apply vertical high pass filters. The vertical filters applied by vertical filter modules 1503, 1504 may include any suitable vertical filter or filters. Furthermore, the filters applied by vertical filter modules 1503, 1504 may be the same or they may be different. Although discussed with respect to vertical filters, any suitable filters such as horizontal or diagonal filters may be applied.

As shown, vertical filtered image data 1514 and vertical filtered resultant image data 1515 may be provided to error module 1506. Error module 1506 may compare a vertical filtered image or images of vertical filtered image data 1514 with a vertical filtered resultant image or images of vertical filtered resultant image data 1515 to generate scoring 1522. Error module 1506 may generate scoring 1522 using any suitable technique or techniques and scoring 1522 may include any suitable scoring, error measurement, or the like. Scoring 1421 and scoring 1522 may be used to train the neural network implemented by neural network encode module 1401 and neural network decode module 1402 such that, for example, the errors represented by scoring 1421 and scoring 1522 may be minimized or a sum, an average, a weighted average or the like of scoring 1421 and scoring 1522 may be minimized. In an embodiment, scoring 1522 may be a Euclidian loss between vertical filtered images of vertical filtered image data 1514 and resultant vertical filtered images vertical filtered resultant image data 1515. In an embodiment, scoring 1522 may be an L2 error between images of image data 1411 and resultant images of resultant image data 1413.

For example, as the neural network implemented by neural network encode module 1401 and neural network decode module 1402 may not completely reconstruct images of image data 1411 in generating resultant images of resultant image data 1413, the implemented neural network may tend to remove high frequency noise and details. In the context of eye regions, some eye regions may include eye-glasses, which may be removed or blurred by a neural network. By adding vertical high pass filtering or the like (e.g., via vertical filter modules 1503, 1504) and training the neural network based on minimizing corresponding scoring 1522, the neural network may be forced to learn to preserve high frequency information such as eye-glasses and other details.

Figure 16:
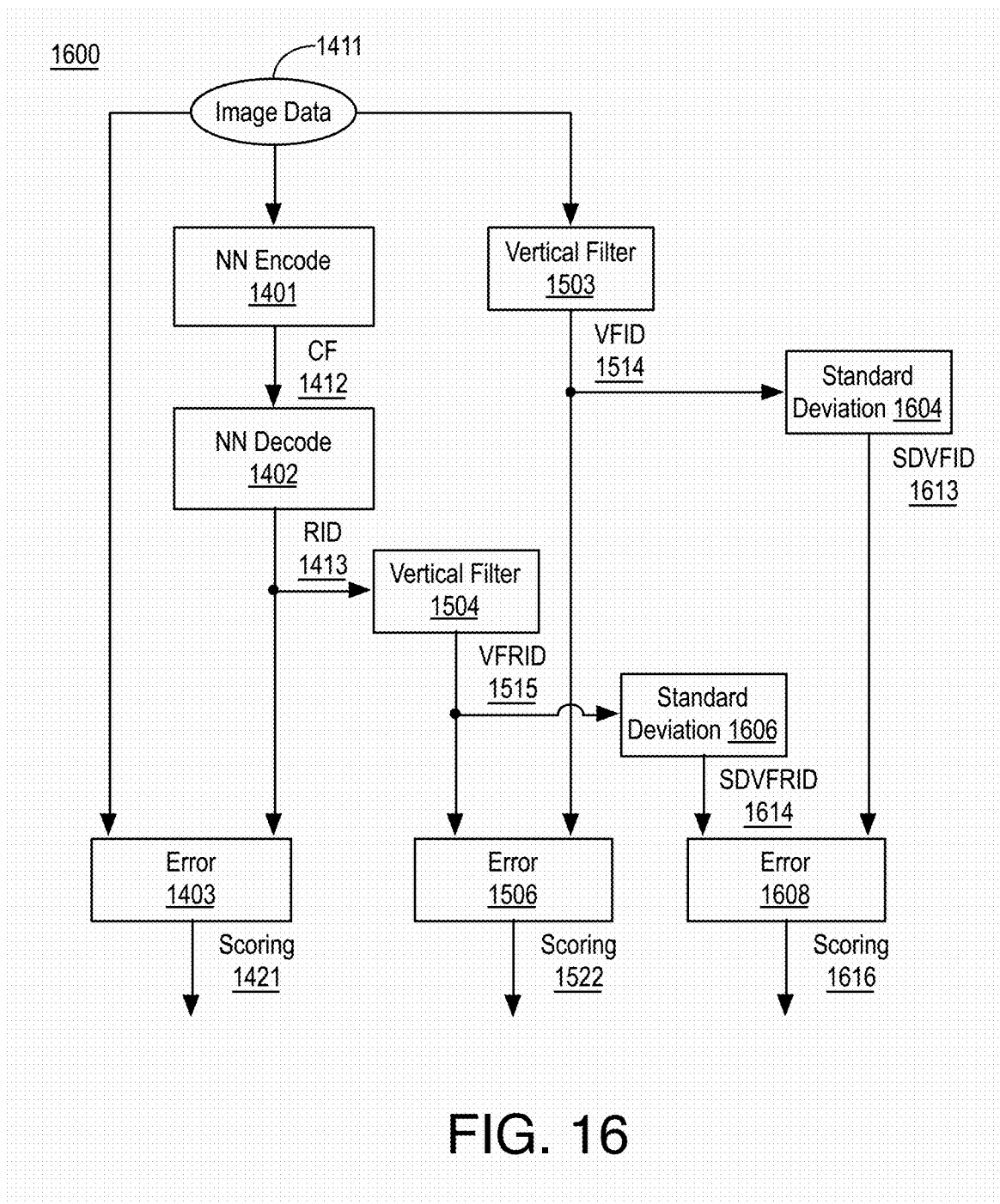
FIG. 16 illustrates an example neural network training system.

FIG. 16 illustrates an example neural network training system 1600, arranged in accordance with at least some implementations of the present disclosure. As shown in FIG. 16, neural network training system 1600 may include neural network encode module 1401, neural network decode module 1402, vertical filter modules 1503, 1504, standard deviation modules 1604, 1606, and error modules 1403, 1506, 1608. As discussed, neural network encode module 1401 may implement a neural network encode portion and neural network decode module 1402 may implement a neural network encode portion such that neural network encode module 1401 and neural network decode module 1402 implement a neural network encode-decode that receives an input image and provides a resultant image that may be compared to the input image. For example, the neural network may be trained to reduce the error between the input image provided to the neural network and the resultant image from the neural network. As discussed, a middle layer parameter set (e.g., compressed features) may be used to train a classifier and both the pretrained encode portion of the neural network and the pretrained classifier may be implemented during an implementation phase in real time to map from an input eye region to a motion vector field, which may be used to warp the eye region to provide eye contact or gaze correction.

As shown, neural network encode module 1401 may receive image data 1411, which may include any suitable image data and neural network encode module 1401 may generate compressed features 1412 as discussed. Neural network decode module 1402 may receive compressed features 1412 and neural network decode module 1402 may generate resultant image data 1413 based on compressed features 1412 also as discussed. Also as shown, image data 1411 and resultant image data 1413 may be provided to error module 1403, which may compare an image or images of image data 1411 with a resultant image or images of resultant image data 1413 to generate scoring 1421. As discussed, error module 1403 may generate scoring 1421 using any suitable technique or techniques and scoring 1421 may include any suitable scoring, error measurement, or the like such as a Euclidian loss or an L2 error between images of image data 1411 and resultant images of resultant image data 1413. Furthermore, image data 1411 and resultant image data 1413 may be provided to vertical filter modules 1503, 1504, respectively, which may apply vertical filters to generate vertical filtered image data 1514 and vertical filtered resultant image data 1515, respectively. As discussed, vertical filtered image data 1514 and vertical filtered resultant image data 1515 may be provided to error module 1506, which may generate scoring 1522. Scoring 1522 may include any suitable scoring, error measurement, or the like.

Also as shown, vertical filtered image data 1514 and vertical filtered resultant image data 1515 may be provided to standard deviation module 1604 and standard deviation module 1608, respectively. Standard deviation module 1604 may receive vertical filtered image data 1514 and standard deviation module 1604 may determine a standard deviation of vertical filtered image data 1514 to generate standard deviation of vertical filtered image data (SDVFID) 1613.

Similarly, standard deviation module 1606 may receive vertical filtered resultant image data 1515 and standard deviation module 1606 may determine a standard deviation of vertical filtered resultant image data 1515 to generate standard deviation of vertical filtered resultant image data (SDVFRID) 1614. Standard deviation modules 1604, 1606 may determine the standard deviations of vertical filtered image data 1514 and vertical filtered resultant image data 1515 using any suitable technique or techniques.

As shown, standard deviation of vertical filtered image data 1613 and standard deviation of vertical filtered resultant image data 1614 may be provided to error module 1608. Error module 1608 may compare standard deviation of vertical filtered image data 1613 for an image or images with standard deviation of vertical filtered resultant image data 1614 for resultant image or images to generate scoring 1616. Error module 1608 may generate scoring 1616 using any suitable technique or techniques and scoring 1616 may include any suitable scoring, error measurement, or the like. Scoring 1421, scoring 1522, and scoring 1616 may be used to train the neural network implemented by neural network encode module 1401 and neural network decode module 1402 such that, for example, the errors represented by scoring 1421 and scoring 1522 may be minimized or a sum, an average, a weighted average or the like of scoring 1421, scoring 1522, and scoring 1616 may be minimized. In an embodiment, scoring 1616 may be a Euclidian loss between the standard deviations of the discussed images. In an embodiment, scoring 1616 may be an L2 error between the standard deviations of the discussed images. Although illustrated with standard deviation modules 1604, 1606 being applied to vertical filtered image and resultant image data, standard deviation modules 1604, 1606 may be applied to image data 1411 and resultant image data 1413, respectively.

For example, scoring 1616, in the training of the neural network implemented by neural network encode module 1401 and neural network decode module 1402, may accelerate learning. For example, in cases where an image of image data 1411 was not encoded well, the difference between the standard deviations may be high while in case where the image is encoded well, the error term corresponding to scoring 1616 may not contribute.

As discussed, the neural network implemented by neural network encode module 1401 and neural network decode module 1402 (and as provided in the implementation phase) may have any suitable characteristics. With reference to FIG. 7, encode portion 710 may have two to eight fully connected layers having any number of nodes and decode portion 720 may have two to eight fully connected layers having any number of nodes. In an embodiment, encode portion 710 has two fully connected layers having 300 and 30 nodes (e.g., with compressed features 712 having 30 features) and decode portion 720 has two fully connected layers having 300 and 2916 nodes (e.g., corresponding to a resultant image having 54×54 pixels). In an embodiment, encode portion 710 has four fully connected layers having 1,000, 500, 250, and 100 nodes (e.g., with compressed features 712 having 100 features) and decode portion 720 has four fully connected layers having 250, 500, 1,000, and 3,564 nodes (e.g., corresponding to a resultant image having 54×66 pixels). In an embodiment, encode portion 710 has six fully connected layers having 4,600, 2,200, 1,000, 500, 250, and 100 nodes (e.g., with compressed features 712 having 100 features) and decode portion 720 has six fully connected layers having 250, 500, 1,000, 2,200, 4,600, and 3,564 nodes (e.g., corresponding to a resultant image having 54×66 pixels).

In other embodiments, encode portion 710 may have convolutional layers followed by max pooling to reduce the size of the layers during implementation. For example, any of the above discussed fully connected encode portion layers may be replaced by a 3×3×3 convolutional layer followed by max pooling. Such modifications may provide faster real-time implementation due to fewer multiplies and adds as compared to fully connected layers at the cost of some loss in quality (although such loss in quality may be virtually unnoticeable visually). In an embodiment, encode portion 710 has four connected with two convolutional neural network layers (the first being 3×3×3 (stride 1)/MaxPool 3×3 (stride 3) and the second being 3×3×3 (stride 1)/MaxPool 3×3 (stride 2)) and two fully connected layers having 250 and 100 nodes (e.g., with compressed features 712 having 100 features) and decode portion 720 has four fully connected layers having 250, 500, 1,000, and 3,564 nodes (e.g., corresponding to a resultant image having 54×66 pixels).

Furthermore, such neural networks may be trained with only input image/resultant image error (e.g., as discussed with respect to FIG. 14), with input image/resultant image error and vertical filtered input image/resultant image error (e.g., as discussed with respect to FIG. 15), with input image/resultant image error, vertical filtered input image/resultant image error, and standard deviation of vertical filtered input image/resultant image error (e.g., as discussed with respect to FIG. 16), or other combinations thereof. Table 1 illustrates example neural network architectures or structure and example training techniques in accordance with at least some implementations of the present disclosure.

shown, source compressed feature sets 918 and likelihood maps 919 may be provided to random forest generator module 907, which may train and determine random forest classifier 920 based on source compressed feature sets 918 and likelihood maps 819. For example, random forest classifier 920 may be trained to determine optimal motion vector fields from source compressed feature sets 918 (e.g., compressed features from an encode portion of a neural network). Training may be performed such that each leaf of a tree in random forest classifier 920 represents a likelihood map (e.g., a SAD map) for every pixel in a source eye region. At each branch of a tree, the training process may minimize the entropy between likelihood maps of the training observations that have arrived to that branch of the tree. Random forest classifier 920 may have any size and data structure as discussed herein such as about 4-8 trees having depths of about 6-7 levels. Furthermore, compression may be applied to generate random forest classifier 920. For example, a training stage pretrained classifier may be compressed by parameterized surface fitting or the like to generate random forest classifier 920.

Figure 17:
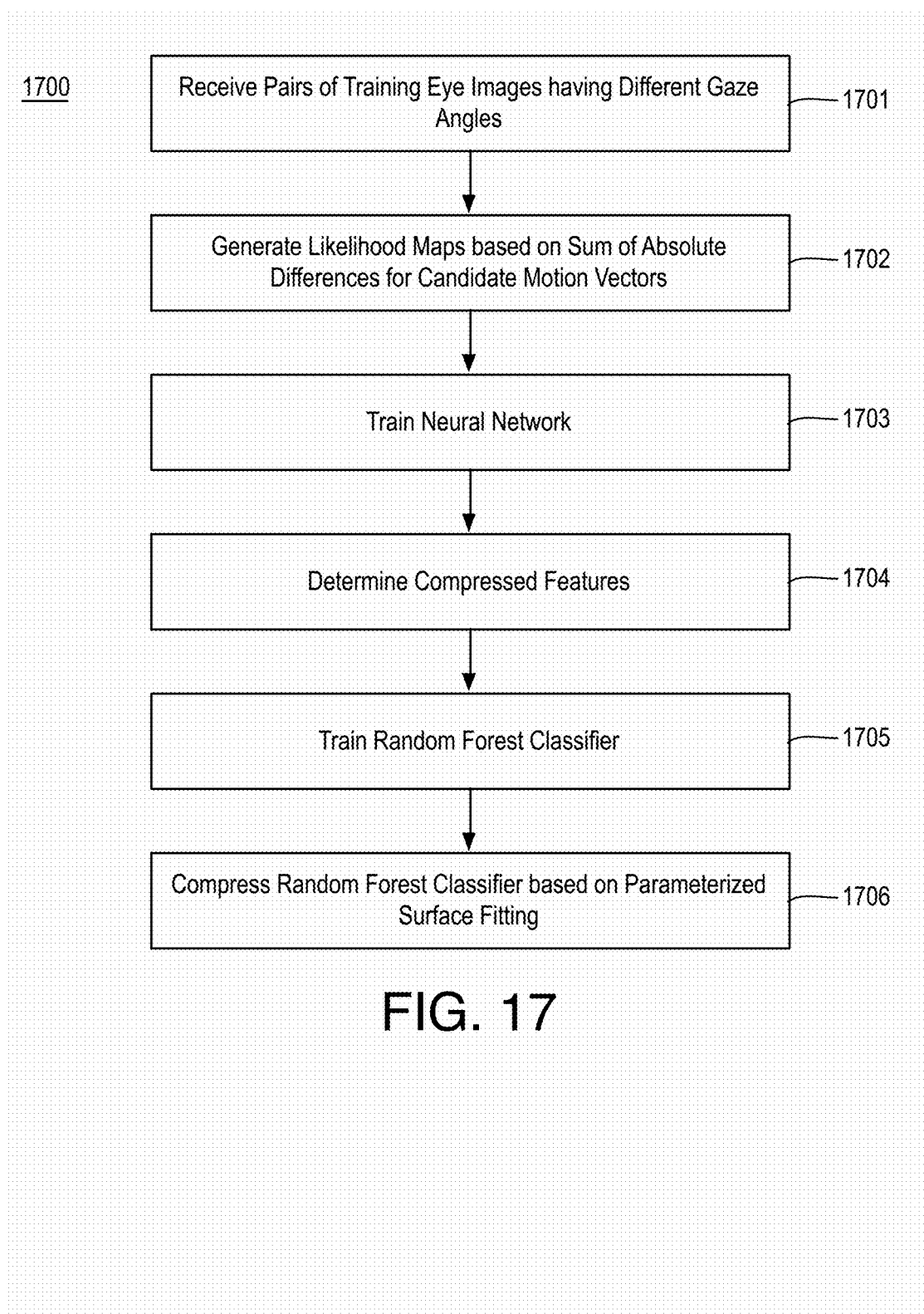
FIG. 17 is a flow diagram illustrating an example process for pretraining an eye contact correction neural network and classifier.

FIG. 17 is a flow diagram illustrating an example process 1700 for pretraining an eye contact correction neural network and classifier, arranged in accordance with at least some implementations of the present disclosure. Process 1700 may include one or more operations 1701-1706 as illustrated in FIG. 17. Process 1700 may form at least part of an eye contact correction neural network and classifier pretraining technique. By way of non-limiting example, process 1700 may form at least part of an eye contact correction neural network and classifier pretraining tech-

| Neural Network/ Training | Neural Network Structure & Training Techniques |
|---|---|
| 1 | 4 Fully Connected Layers (2 Encode, 2 Decode)<br>30 Compressed Features<br>Input Image/Resultant Image Euclidean Loss Error Only |
| 2 | 8 Fully Connected Layers (4 Encode, 4 Decode)<br>100 Compressed Features<br>Input image/Resultant Image Euclidean Loss Error Only |
| 3 | 8 Fully Connected Layers (4 Encode, 4 Decode)<br>100 Compressed Features<br>Input image/Resultant Image Euclidean Loss & Vertical Filter Loss |
| 4 | 12 Fully Connected Layers (6 Encode, 6 Decode)<br>100 Compressed Features<br>Input image/Resultant Image Euclidean Loss & Vertical Filter Loss |
| 5 | 12 Fully Connected Layers (6 Encode, 6 Decode)<br>100 Compressed Features<br>Input image/Resultant Image Euclidean Loss, Vertical Filter Loss, &<br>Standard Deviation of Vertical Filter |
| 6 | 8 Fully Connected Layers (6 Encode, 6 Decode)<br>100 Compressed Features<br>Input image/Resultant Image Euclidean Loss, Vertical Filter Loss, &<br>Standard Deviation of Vertical Filter |
| 7 | 8 Layers (Encode: 1 Convolutional, 3 Fully Connected; Decode: 4 Fully Connected)<br>100 Compressed Features<br>Input image/Resultant Image Euclidean Loss, Vertical Filter Loss, &<br>Standard Deviation of Vertical Filter |
| 8 | 8 Layers (Encode: 2 Convolutional, 2 Fully Connected; Decode: 4 Fully Connected)<br>100 Compressed Features<br>Input image/Resultant Image Euclidean Loss, Vertical Filter Loss, &<br>Standard Deviation of Vertical Filter |

Returning to FIG. 9, source compressed feature sets 918 may include compressed features for each source eye region of source eye regions 916 and likelihood maps 919 may include a likelihood map for each pixel (or block of pixels) of each source eye region of source eye regions 916. As nique performed by system 900 as discussed herein. Furthermore, process 1700 may be performed by system 1900, which is described below.

Process 1700 may begin at operation 1701, where multiple of pairs of training eye region images may be received.

For example, first images of the pairs of training eye region images may have a gaze angle difference with respect to second images of the pairs of training eye region images. In an embodiment, the multiple of pairs of training eye region images may be received by system 1900. For example, training images 911 or the like may be received.

Processing may continue at operation 1702, where a likelihood map may be generated for each pixel of each of the first images of the pairs of training eye region images. For example, each likelihood map may include a sum of absolute differences or other measure of similarity for each of multiple candidate motion vectors corresponding to each pixel. The likelihood maps be generated using any suitable technique or techniques. For example, likelihood maps may be generated by central processor 1901 of system 1900.

Processing may continue at operation 1703, where a neural network may be trained based on the first images of the pairs of training eye region images, the second images of the pairs of training eye region images, and/or other training images. The neural network may be trained using any suitable technique or techniques. For example, the neural network may be trained based on an encode of the training images, to generate training stage compressed features, a decode of the training stage compressed features to generate resultant training images, and a scoring of the training images and the resultant training images. For example, the encode of the training images may be performed by an encode portion of a neural network, the decode of the training stage compressed features may be performed by a decode portion of a neural network, and the scoring may represent an error between the training images and the resultant training images. In an embodiment, the scoring may, in addition or in the alternative, include vertically filtering the training images and the resultant training images to generate vertically filtered training images and vertically filtered training first images, respectively, and determining an error between the vertically filtered training images and the vertically filtered resultant training images. Furthermore, in addition or in the alternative, the scoring may include determining a standard deviation of the vertically filtered training images and a standard deviation of the vertically filtered resultant training images and determining an error between the standard deviations. Such an error or errors may be used as a feedback to train the neural network such that the error or errors may be minimized during the training. As discussed, the encode portion of the trained neural network may be implemented during an implementation phases or during runtime to generate compressed features. In an embodiment, the neural network may be trained by central processor 1901 of system 1900.

Processing may continue at operation 1704, where training stage compressed features may be determined for the first images of the pairs of training eye region images. The compressed features may be determined using any suitable technique or techniques. For example, determining the compressed features may include applying an encode portion of the trained neural network to the first images of the pairs of training eye region images to generate a set of compressed features for each of the training eye region images. In an embodiment, the training stage compressed features may be determined by central processor 1901 of system 1900.

Processing may continue at operation 1705, where a pretrained classifier may be trained based on the likelihood maps determined at operation 1702 and the training stage compressed feature sets determined at operation 1704. The pretrained classifier may include any suitable pretrained classifier such as a random forest classifier and the pretrained classifier may be trained using any suitable technique or techniques. In an embodiment, the pretrained classifier may be trained by central processor 1901 of system 1900. In an embodiment, the pretrained classifier generated at operation 1905 may be characterized as a training stage pretrained classifier or the like.

Processing may continue at operation 1706, where the pretrained classifier generated at operation 1705 may be compressed. The pretrained classifier may be compressed using any suitable technique or techniques. In an embodiment, the pretrained classifier may be compressed based on parameterized surface fitting. In an embodiment, the pretrained classifier may be compressed by central processor 1901 of system 1900. In an embodiment, a training stage pretrained classifier determined at operation 1705 may be compressed by parameterized surface fitting at operation 1706 to generate a pretrained classifier such as a random forest classifier for implementation in an implementation phase to provide eye contact correction.

Figure 18:
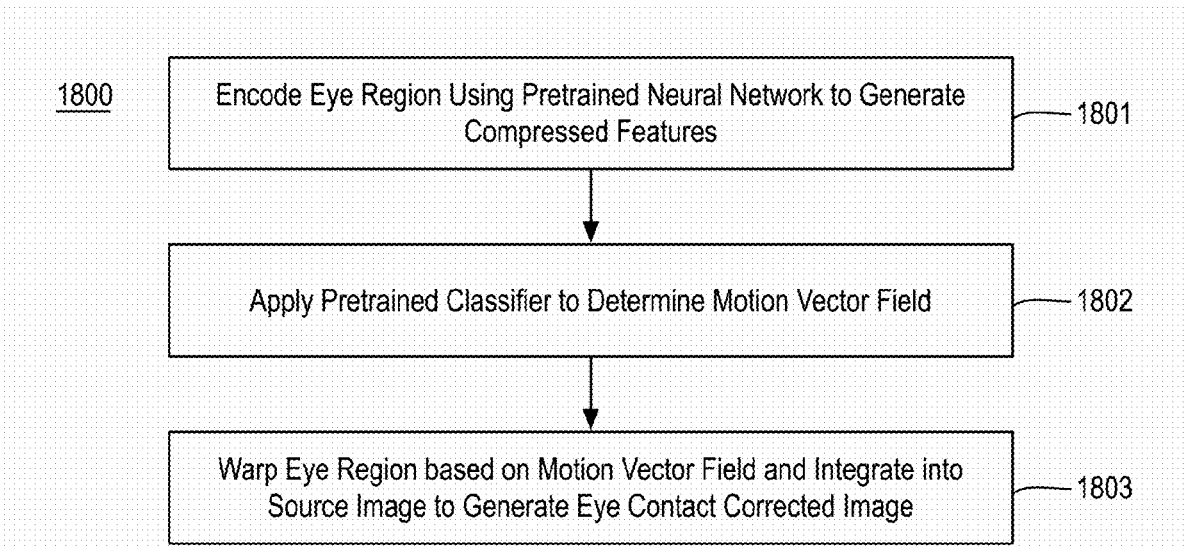
FIG. 18 is a flow diagram illustrating an example process for providing eye contact correction.

FIG. 18 is a flow diagram illustrating an example process 1800 for providing eye contact correction, arranged in accordance with at least some implementations of the present disclosure. Process 1800 may include one or more operations 1801-1803 as illustrated in FIG. 18. Process 1800 may form at least part of an eye contact correction technique. By way of non-limiting example, process 1800 may form at least part of an eye contact correction technique performed by system 200 as discussed herein. Furthermore, process 1800 will be described herein with reference to system 1900 of FIG. 19.

Figure 19:
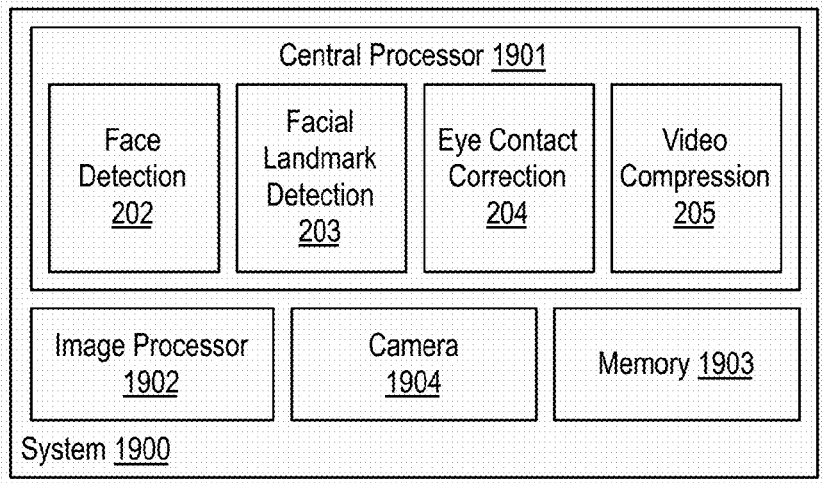
FIG. 19 is an illustrative diagram of an example system for providing eye contact correction.

FIG. 19 is an illustrative diagram of an example system 1900 for providing eye contact correction, arranged in accordance with at least some implementations of the present disclosure. As shown in FIG. 19, system 1900 may include a central processor 1901, an image processor 1902, a memory 1903, and a camera 1904. For example, camera 1904 and a display (not shown) may have an offset therebetween. Also as shown, central processor 1901 may include or implement face detection module 202, facial landmark detection module 203, eye contact correction module 204, and video compression module 205. Such components or modules may be implemented to perform operations as discussed herein. Memory 1903 may store images, image data, input images, image sensor data, face detection data, facial landmarks, eye contact correction images, compressed bitstreams, eye regions, compressed features, feature sets, neural network weighing factors and/or parameters, pretrained classifier models, or any other data discussed herein.

As shown, in some examples, face detection module 202, facial landmark detection module 203, eye contact correction module 204, and video compression module 205 may be implemented via central processor 1901. In other examples, one or more or portions of face detection module 202, facial landmark detection module 203, eye contact correction module 204, and video compression module 205 may be implemented via image processor 1902, a video processor, a graphics processor, or the like. In yet other examples, one or more or portions of face detection module 202, facial landmark detection module 203, eye contact correction module 204, and video compression module 205 may be implemented via an image or video processing pipeline or unit.

Image processor 1902 may include any number and type of graphics, image, or video processing units that may provide the operations as discussed herein. In some examples, image processor 1902 may be an image signal processor. Such operations may be implemented via software or hardware or a combination thereof. For example, image processor 1902 may include circuitry dedicated to manipulate frame data, image data, or video data obtained from memory 1903. Central processor 1901 may include any number and type of processing units or modules that may provide control and other high level functions for system 1900 and/or provide any operations as discussed herein. Memory 1903 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1903 may be implemented by cache memory.

In an embodiment, one or more or portions of face detection module 202, facial landmark detection module 203, eye contact correction module 204, and video compression module 205 may be implemented via an execution unit (EU) of image processor 1902. The EU may include, for example, programmable logic or circuitry such as a logic core or cores that may provide a wide array of programmable logic functions. In an embodiment, one or more or portions of face detection module 202, facial landmark detection module 203, eye contact correction module 204, and video compression module 205 may be implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of face detection module 202, facial landmark detection module 203, eye contact correction module 204, and video compression module 205 may be implemented via an application specific integrated circuit (ASIC). The ASIC may include an integrated circuitry customized to perform the operations discussed herein. Camera 1904 may include any camera having any suitable number of lenses or the like for capturing images or video.

Returning to discussion of FIG. 18, process 1800 may begin at operation 1801, where an eye region of a source image may be encoded by a pretrained neural network to generate compressed features corresponding to the eye region of the source image. The eye region may be encoded by any suitable pretrained neural network using any suitable technique or techniques to generate compressed features. In an embodiment, the eye region may be encoded by an encode portion of a neural network. The encode portion of the neural network may include any suitable architecture or structure. In an embodiment, the pretrained neural network is a fully connected neural network such as a deep neural network. In an embodiment, the pretrained neural network includes multiple layers including at least one convolutional neural network layer. In an embodiment, the pretrained neural network includes four layers, in order: a first convolutional neural network layer, a second convolutional neural network layer, a first fully connected layer, and a second fully connected layer such that the second fully connected layer provides the compressed features. In an embodiment, the compressed features may be determined by a neural network as implemented by central processor 1901 of system 1900.

Furthermore, in some embodiments, the eye region of the source image may be received. In other embodiments, the eye region may be generated from the source image. The eye region may be generated from the source image using any suitable technique or techniques. In an embodiment, the eye region may be generated from the source image by providing face detection and face landmark detection on the source image and cropping the source image based on the face detection and the face landmark detection to generate the eye region. In an embodiment, the eye region may be determined from the source image by central processor 1901 of system 1900.

Processing may continue at operation 1802, where a pretrained classifier may be applied to the compressed features to determine a motion vector field for the eye region of the source image. The pretrained classifier may include any suitable pretrained classifier and the pretrained classifier may be applied using any suitable technique or techniques. In an embodiment, the pretrained classifier is a pretrained random forest classifier having a leaf corresponding to the motion vector field. In an embodiment, the pretrained classifier is may be provided at operation 1706 of process 1700. In an embodiment, the pretrained classifier may be applied by central processor 1901 of system 1900.

Processing may continue at operation 1803, where the eye region of the source image may be warped based on the motion vector field and the warped eye region may be integrated into a remaining portion of the source image to generate an eye contact corrected image. For example, the remaining portion may be the portion of the source image other than the eye region being warped. The eye region may be warped and integrated into the remaining portion of the source image to generate the eye contact corrected image using any suitable technique or techniques. In an embodiment, the eye region may be warped and integrated into the remaining portion of the source image to generate the eye contact corrected image by central processor 1901 of system 1900. As discussed herein, the eye contact corrected image may provide an apparent gaze of the user toward a camera as opposed to toward a display (e.g., the eye contact corrected image may correct for an offset between a display and a camera) such that a remote user of the image has a more pleasing response and such that the user can look at the remote user on the local display. In an embodiment, the eye contact corrected image may be encoded and transmitted to a remote device for presentment to a user (e.g., a remote user of a remote device). For example, the eye contact corrected image may be an image (or frame) of a video sequence and the video sequence may be encoded and transmitted.

Process 1800 may be repeated for any number of eye regions of a source image, for any number of source images, or any number of video sequences of source images. Furthermore, operations 1801 and/or 1802 may be responsive to or selectively provided based on a camera and a display having a first relative position therebetween. If the camera and display had a second relative position therebetween, operation 1801 and/or 1802 may be performed based on different pretrained factors (e.g., a different neural network and/or a different pretrained classifier). In an embodiment, when the camera and the display have a second relative position therebetween, process 1800 may further include encoding, by a second pretrained neural network, the eye region of the source image to generate second compressed features corresponding to the eye region of the source image, applying a second pretrained classifier to the second compressed features to determine a second motion vector field for the eye region of the source image, and warping the eye region of the source image based on the second motion vector field and integrating the warped eye region into the remaining portion of the source image to generate the eye contact corrected image.

Various components of the systems described herein may be implemented in software, firmware, and/or hardware and/or any combination thereof. For example, various components of the systems discussed herein may be provided, at least in part, by hardware of a computing System-on-a-Chip (SoC) such as may be found in a computing system such as, for example, a smartphone. Those skilled in the art may recognize that systems described herein may include additional components that have not been depicted in the corresponding figures. For example, the systems discussed herein may include additional components such as communications modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the systems discussed herein or any other module or component as discussed herein.

As used in any implementation described herein, the term "module" or "component" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hard-wired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 20:
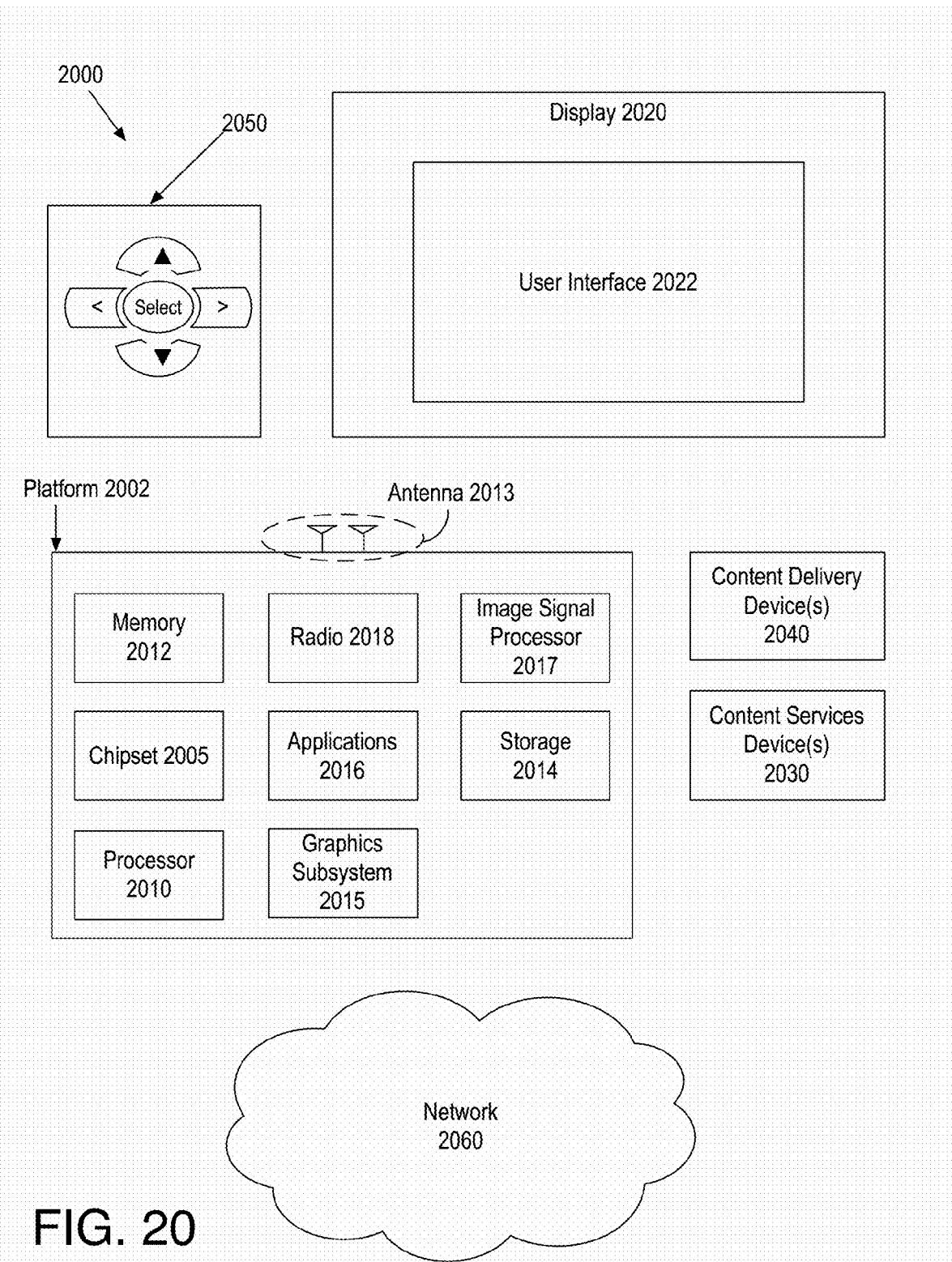
FIG. 20 is an illustrative diagram of an example system.

FIG. 20 is an illustrative diagram of an example system 2000, arranged in accordance with at least some implementations of the present disclosure. In various implementations, system 2000 may be a mobile system although system 2000 is not limited to this context. System 2000 may implement and/or perform any modules or techniques discussed herein. For example, system 2000 may be incorporated into a personal computer (PC), server, laptop computer, ultra-laptop computer, tablet, touch pad, portable computer, handheld computer, palmtop computer, personal digital assistant (PDA), cellular telephone, combination cellular telephone/PDA, television, smart device (e.g., smartphone, smart tablet or smart television), mobile internet device (MID), messaging device, data communication device, cameras (e.g. point-and-shoot cameras, super-zoom cameras, digital single-lens reflex (DSLR) cameras), and so forth. In some examples, system 2000 may be implemented via a cloud computing environment.

In various implementations, system 2000 includes a platform 2002 coupled to a display 2020. Platform 2002 may receive content from a content device such as content services device(s) 2030 or content delivery device(s) 2040 or other similar content sources. A navigation controller 2050 including one or more navigation features may be used to interact with, for example, platform 2002 and/or display 2020. Each of these components is described in greater detail below.

In various implementations, platform 2002 may include any combination of a chipset 2005, processor 2010, memory 2012, antenna 2013, storage 2014, graphics subsystem 2015, applications 2016 and/or radio 2018. Chipset 2005 may provide intercommunication among processor 2010, memory 2012, storage 2014, graphics subsystem 2015, applications 2016 and/or radio 2018. For example, chipset 2005 may include a storage adapter (not depicted) capable of providing intercommunication with storage 2014.

Processor 2010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 2010 may be dual-core processor(s), dual-core mobile processor(s), and so forth.

Memory 2012 may be implemented as a volatile memory device such as, but not limited to, a Random Access Memory (RAM), Dynamic Random Access Memory (DRAM), or Static RAM (SRAM).

Storage 2014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 2014 may include technology to increase the storage performance enhanced protection for valuable digital media when multiple hard drives are included, for example.

Image signal processor 2017 may be implemented as a specialized digital signal processor or the like used for image or video frame processing. In some examples, image signal processor 2017 may be implemented based on a single instruction multiple data or multiple instruction multiple data architecture or the like. In some examples, image signal processor 2017 may be characterized as a media processor. As discussed herein, image signal processor 2017 may be implemented based on a system on a chip architecture and/or based on a multi-core architecture.

Graphics subsystem 2015 may perform processing of images such as still or video for display. Graphics subsystem 2015 may be a graphics processing unit (GPU) or a visual processing unit (VPU), for example. An analog or digital interface may be used to communicatively couple graphics subsystem 2015 and display 2020. For example, the interface may be any of a High-Definition Multimedia Interface, DisplayPort, wireless HDMI, and/or wireless HD compliant techniques. Graphics subsystem 2015 may be integrated into processor 2010 or chipset 2005. In some implementations, graphics subsystem 2015 may be a stand-alone device communicatively coupled to chipset 2005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 2018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 2018 may operate in accordance with one or more applicable standards in any version.

In various implementations, display 2020 may include any television type monitor or display. Display 2020 may include, for example, a computer display screen, touch screen display, video monitor, television-like device, and/or a television. Display 2020 may be digital and/or analog. In various implementations, display 2020 may be a holographic display. Also, display 2020 may be a transparent surface that may receive a visual projection. Such projections may convey various forms of information, images, and/or objects. For example, such projections may be a visual overlay for a mobile augmented reality (MAR) application. Under the control of one or more software applications 2016, platform 2002 may display user interface 2022 on display 2020.

In various implementations, content services device(s) 2030 may be hosted by any national, international and/or independent service and thus accessible to platform 2002 via the Internet, for example. Content services device(s) 2030 may be coupled to platform 2002 and/or to display 2020. Platform 2002 and/or content services device(s) 2030 may be coupled to a network 2060 to communicate (e.g., send and/or receive) media information to and from network 2060. Content delivery device(s) 2040 also may be coupled to platform 2002 and/or to display 2020.

In various implementations, content services device(s) 2030 may include a cable television box, personal computer, network, telephone, Internet enabled devices or appliance capable of delivering digital information and/or content, and any other similar device capable of uni-directionally or bi-directionally communicating content between content providers and platform 2002 and/display 2020, via network 2060 or directly. It will be appreciated that the content may be communicated uni-directionally and/or bi-directionally to and from any one of the components in system 2000 and a content provider via network 2060. Examples of content may include any media information including, for example, video, music, medical and gaming information, and so forth.

Content services device(s) 2030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 2002 may receive control signals from navigation controller 2050 having one or more navigation features. The navigation features of navigation controller 2050 may be used to interact with user interface 2022, for example. In various embodiments, navigation controller 2050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 2050 may be replicated on a display (e.g., display 2020) by movements of a pointer, cursor, focus ring, or other visual indicators displayed on the display. For example, under the control of software applications 2016, the navigation features located on navigation controller 2050 may be mapped to virtual navigation features displayed on user interface 2022, for example. In various embodiments, navigation controller 2050 may not be a separate component but may be integrated into platform 2002 and/or display 2020. The present disclosure, however, is not limited to the elements or in the context shown or described herein.

In various implementations, drivers (not shown) may include technology to enable users to instantly turn on and off platform 2002 like a television with the touch of a button after initial boot-up, when enabled, for example. Program logic may allow platform 2002 to stream content to media adaptors or other content services device(s) 2030 or content delivery device(s) 2040 even when the platform is turned "off." In addition, chipset 2005 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 2000 may be integrated. For example, platform 2002 and content services device(s) 2030 may be integrated, or platform 2002 and content delivery device(s) 2040 may be integrated, or platform 2002, content services device(s) 2030, and content delivery device(s) 2040 may be integrated, for example. In various embodiments, platform 2002 and display 2020 may be an integrated unit. Display 2020 and content service device(s) 2030 may be integrated, or display 2020 and content delivery device(s) 2040 may be integrated, for example. These examples are not meant to limit the present disclosure.

In various embodiments, system 2000 may be implemented as a wireless system, a wired system, or a combination of both. When implemented as a wireless system, system 2000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 2000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 2002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 20.

Figure 21:
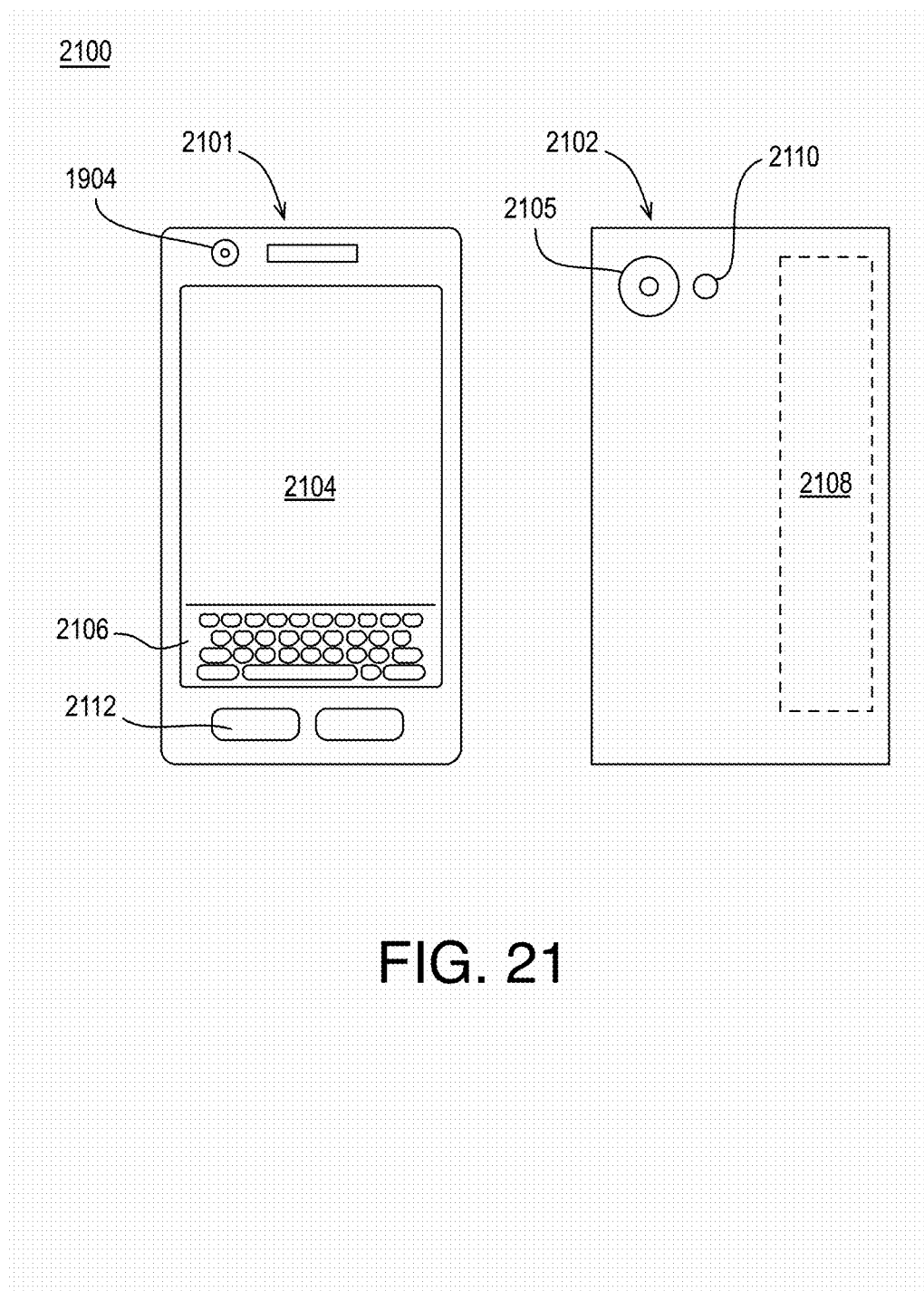
FIG. 21 illustrates an example small form factor device, all arranged in accordance with at least some implementations of the present disclosure.

As described above, system 2000 may be embodied in varying physical styles or form factors. FIG. 21 illustrates an example small form factor device 2100, arranged in accordance with at least some implementations of the present disclosure. In some examples, system 2000 may be implemented via device 2100. In other examples, other systems discussed herein or portions thereof may be implemented via device 2100. In various embodiments, for example, device 2100 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 21, device 2100 may include a housing with a front 2101 and a back 2102. Device 2100 includes a display 2104, an input/output (I/O) device 2106, camera 1904, a camera 2105, and an integrated antenna 2108. Device 2100 also may include navigation features 2112. I/O device 2106 may include any suitable I/O device for entering information into a mobile computing device. Examples for I/O device 2106 may include an alphanumeric keyboard, a numeric keypad, a touch pad, input keys, buttons, switches, microphones, speakers, voice recognition device and software, and so forth. Information also may be entered into device 2100 by way of microphone (not shown), or may be digitized by a voice recognition device. As shown, device 2100 may include camera 2105 and a flash 2110 integrated into back 2102 (or elsewhere) of device 2100 and camera 1904 integrated into front 2101 of device 2100. In some embodiments, either or both of cameras 1904, 2105 may be moveable with respect to display 2104. Camera 1904 and/or camera 2105 may be components of an imaging module or pipeline to originate color image data processed into streaming video that is output to display 2104 and/or communicated remotely from device 2100 via antenna 2108 for example. For example, camera 1904 may capture input images and eye contact corrected images may be provided to display 2104 and/or communicated remotely from device 2100 via antenna 2108.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a machine implemented method for providing eye contact correction comprises encoding, via a pretrained neural network, an eye region of a source image to generate compressed features corresponding to the eye region of the source image, applying a pretrained classifier to the compressed features to determine a motion vector field for the eye region of the source image, and warping the eye region of the source image based on the motion vector field and integrating the warped eye region into a remaining portion of the source image to generate an eye contact corrected image.

Further to the first embodiments, the pretrained neural network comprises a plurality of layers including at least one convolutional neural network layer.

Further to the first embodiments, the pretrained neural network comprises four layers, the four layers comprising, in order: a first convolutional neural network layer, a second convolutional neural network layer, a first fully connected layer, and a second fully connected layer, wherein the second fully connected layer provides the compressed features.

Further to the first embodiments, the pretrained classifier comprises a pretrained random forest classifier having a leaf corresponding to the motion vector field.

Further to the first embodiments, wherein the pretrained neural network comprises a plurality of layers including at least one convolutional neural network layer and/or the pretrained classifier comprises a pretrained random forest classifier having a leaf corresponding to the motion vector field.

Further to the first embodiments, the method further comprises providing face detection and face landmark detection on the source image and cropping the source image based on the face detection and the face landmark detection to generate the eye region.

Further to the first embodiments, the method further comprises encoding and transmitting the final image to a remote device for presentment to a user.

Further to the first embodiments, the method further comprises providing face detection and face landmark detection on the source image, cropping the source image based on the face detection and the face landmark detection to generate the eye region, and/or encoding and transmitting the final image to a remote device for presentment to a user.

Further to the first embodiments, said encoding of the eye region and said applying the pretrained classifier to the compressed features to determine the motion vector field for the eye region of the source image are selectively provided based on a camera and a display having a first relative position therebetween, and the method further comprises, when the camera and the display have a second relative position therebetween, encoding, via a second pretrained neural network, the eye region of the source image to generate second compressed features corresponding to the eye region of the source image, applying a second pretrained classifier to the second compressed features to determine a second motion vector field for the eye region of the source image, and warping the eye region of the source image based on the second motion vector field and integrating the warped eye region into the remaining portion of the source image to generate the eye contact corrected image.

Further to the first embodiments, the method further comprises receiving a plurality of pairs of training eye region images, wherein first images of the pairs of training eye region images have a gaze angle difference with respect to second images of the pairs of training eye region images and training the pretrained neural network based on an encode of the first images by the pretrained neural network to generate training stage compressed features, a decode of the training stage compressed features to generate resultant first images corresponding to the first images, and a scoring of the first images and the resultant first images.

Further to the first embodiments, the method further comprises receiving a plurality of pairs of training eye region images, wherein first images of the pairs of training eye region images have a gaze angle difference with respect to second images of the pairs of training eye region images and training the pretrained neural network based on an encode of the first images by the pretrained neural network to generate training stage compressed features, a decode of the training stage compressed features to generate resultant first images corresponding to the first images, and a scoring of the first images and the resultant first images, the scoring of the first images and the resultant first images comprises an error between the first images and the resultant first images.

Further to the first embodiments, the method further comprises receiving a plurality of pairs of training eye region images, wherein first images of the pairs of training eye region images have a gaze angle difference with respect to second images of the pairs of training eye region images and training the pretrained neural network based on an encode of the first images by the pretrained neural network to generate training stage compressed features, a decode of the training stage compressed features to generate resultant first images corresponding to the first images, and a scoring of the first images and the resultant first images, wherein the scoring of the first images and the resultant first images comprises vertically filtering the first images and the resultant first images to generate vertically filtered first images and vertically filtered resultant first images, respectively, and determining an error between the vertically filtered first images and the vertically filtered resultant first images.

Further to the first embodiments, the method further comprises receiving a plurality of pairs of training eye region images, wherein first images of the pairs of training eye region images have a gaze angle difference with respect to second images of the pairs of training eye region images and training the pretrained neural network based on an encode of the first images by the pretrained neural network to generate training stage compressed features, a decode of the training stage compressed features to generate resultant first images corresponding to the first images, and a scoring of the first images and the resultant first images, wherein the scoring of the first images and the resultant first images comprises an error between the first images and the resultant first images and/or wherein the scoring of the first images and the resultant first images comprises vertically filtering the first images and the resultant first images to generate vertically filtered first images and vertically filtered resultant first images, respectively, and determining an error between the vertically filtered first images and the vertically filtered resultant first images.

Further to the first embodiments, the method further comprises receiving a plurality of pairs of training eye region images, wherein first images of the pairs of training eye region images have a gaze angle difference with respect to second images of the pairs of training eye region images, training the pretrained neural network based on an encode of the first images by the pretrained neural network to generate training stage compressed features, a decode of the training stage compressed features to generate resultant first images corresponding to the first images, and a scoring of the first images and the resultant first images, generating a likelihood map for each pixel of each of the first images of the pairs of training eye region images, wherein each likelihood map comprises a sum of absolute differences for each of a plurality of candidate motion vectors corresponding to the pixel, and training a training stage pretrained classifier based on the likelihood maps and the training stage compressed features.

Further to the first embodiments, the method further comprises receiving a plurality of pairs of training eye region images, wherein first images of the pairs of training eye region images have a gaze angle difference with respect to second images of the pairs of training eye region images, training the pretrained neural network based on an encode of the first images by the pretrained neural network to generate training stage compressed features, a decode of the training stage compressed features to generate resultant first images corresponding to the first images, and a scoring of the first images and the resultant first images, generating a likelihood map for each pixel of each of the first images of the pairs of training eye region images, wherein each likelihood map comprises a sum of absolute differences for each of a plurality of candidate motion vectors corresponding to the pixel, training a training stage pretrained classifier based on the likelihood maps and the training stage compressed features, and compressing the training stage pretrained classifier by parameterized surface fitting to generate the pretrained classifier.

In one or more second embodiments, a system for providing eye contact correction comprises a memory configured to store a source image and a processor coupled to the memory, the processor to encode, via a pretrained neural network, an eye region of a source image to generate compressed features corresponding to the eye region of the source image, to apply a pretrained classifier to the compressed features to determine a motion vector field for the eye region of the source image, and to warp the eye region of the source image based on the motion vector field and integrate the warped eye region into a remaining portion of the source image to generate an eye contact corrected image.

Further to the second embodiments, the pretrained neural network comprises a plurality of layers including at least one convolutional neural network layer.

Further to the second embodiments, the pretrained neural network comprises four layers, the four layers comprising, in order: a first convolutional neural network layer, a second convolutional neural network layer, a first fully connected layer, and a second fully connected layer, wherein the second fully connected layer provides the compressed features.

Further to the second embodiments, the pretrained classifier comprises a pretrained random forest classifier having a leaf corresponding to the motion vector field.

Further to the second embodiments, the processor is further to provide face detection and face landmark detection on the source image and to crop the source image based on the face detection and the face landmark detection to generate the eye region.

Further to the second embodiments, the processor is further to encode and transmit the final image to a remote device for presentment to a user.

Further to the second embodiments, to encode the eye region and to apply the pretrained classifier to the compressed features to determine the motion vector field for the eye region of the source image are selectively provided based on a camera and a display having a first relative position therebetween, the processor further, when the camera and the display have a second relative position therebetween, to encode, via a second pretrained neural network, the eye region of the source image to generate second compressed features corresponding to the eye region of the source image, to apply a second pretrained classifier to the second compressed features to determine a second motion vector field for the eye region of the source image, and to warp the eye region of the source image based on the second motion vector field and integrate the warped eye region into the remaining portion of the source image to generate the eye contact corrected image.

Further to the second embodiments, the processor is further to receive a plurality of pairs of training eye region images, wherein first images of the pairs of training eye region images have a gaze angle difference with respect to second images of the pairs of training eye region images, and to train the pretrained neural network based on an encode of the first images by the pretrained neural network to generate training stage compressed features, a decode of the training stage compressed features to generate resultant first images corresponding to the first images, and a scoring of the first images and the resultant first images.

Further to the second embodiments, the processor is further to receive a plurality of pairs of training eye region images, wherein first images of the pairs of training eye region images have a gaze angle difference with respect to second images of the pairs of training eye region images, and to train the pretrained neural network based on an encode of the first images by the pretrained neural network to generate training stage compressed features, a decode of the training stage compressed features to generate resultant first images corresponding to the first images, and a scoring of the first images and the resultant first images, wherein the scoring of the first images and the resultant first images comprises to processor to vertically filter the first images and the resultant first images to generate vertically filtered first images and vertically filtered resultant first images, respectively, and to determine an error between the vertically filtered first images and the vertically filtered resultant first images.

Further to the second embodiments, the processor is further to receive a plurality of pairs of training eye region images, wherein first images of the pairs of training eye region images have a gaze angle difference with respect to second images of the pairs of training eye region images, and to train the pretrained neural network based on an encode of the first images by the pretrained neural network to generate training stage compressed features, a decode of the training stage compressed features to generate resultant first images corresponding to the first images, and a scoring of the first images and the resultant first images, wherein the processor is further to generate a likelihood map for each pixel of each of the first images of the pairs of training eye region images, wherein each likelihood map comprises a sum of absolute differences for each of a plurality of candidate motion vectors corresponding to the pixel, and to train a training stage pretrained classifier based on the likelihood maps and the training stage compressed features.

Further to the second embodiments, the processor is further to receive a plurality of pairs of training eye region images, wherein first images of the pairs of training eye region images have a gaze angle difference with respect to second images of the pairs of training eye region images, to train the pretrained neural network based on an encode of the first images by the pretrained neural network to generate training stage compressed features, a decode of the training stage compressed features to generate resultant first images corresponding to the first images, and a scoring of the first images and the resultant first images, to generate a likelihood map for each pixel of each of the first images of the pairs of training eye region images, wherein each likelihood map comprises a sum of absolute differences for each of a plurality of candidate motion vectors corresponding to the pixel, and to train a training stage pretrained classifier based on the likelihood maps and the training stage compressed features.

Further to the second embodiments, the processor is further to receive a plurality of pairs of training eye region images, wherein first images of the pairs of training eye region images have a gaze angle difference with respect to second images of the pairs of training eye region images, to train the pretrained neural network based on an encode of the first images by the pretrained neural network to generate training stage compressed features, a decode of the training stage compressed features to generate resultant first images corresponding to the first images, and a scoring of the first images and the resultant first images, to generate a likelihood map for each pixel of each of the first images of the pairs of training eye region images, wherein each likelihood map comprises a sum of absolute differences for each of a plurality of candidate motion vectors corresponding to the pixel, to train a training stage pretrained classifier based on the likelihood maps and the training stage compressed features, and to compress the training stage pretrained classifier by parameterized surface fitting to generate the pretrained classifier.

In one or more third embodiments, a system comprises means for encoding, via a pretrained neural network, an eye region of a source image to generate compressed features corresponding to the eye region of the source image, means for applying a pretrained classifier to the compressed features to determine a motion vector field for the eye region of the source image, and means for warping the eye region of the source image based on the motion vector field and integrating the warped eye region into a remaining portion of the source image to generate an eye contact corrected image.

Further to the third embodiments, the pretrained neural network comprises a plurality of layers including at least one convolutional neural network layer.

Further to the third embodiments, the pretrained classifier comprises a pretrained random forest classifier having a leaf corresponding to the motion vector field.

Further to the third embodiments, the means for encoding of eye region and the means for applying the pretrained classifier to the compressed features to determine the motion vector field for the eye region of the source image are responsive to a camera and a display having a first relative position therebetween and the system further comprises, when the camera and the display have a second relative position therebetween means for encoding, via a second pretrained neural network, the eye region of the source image to generate second compressed features corresponding to the eye region of the source image, means for applying a second pretrained classifier to the second compressed features to determine a second motion vector field for the eye region of the source image, and means for warping the eye region of the source image based on the second motion vector field and integrating the warped eye region into the remaining portion of the source image to generate the eye contact corrected image.

Further to the third embodiments, the system further comprises means for receiving a plurality of pairs of training eye region images, wherein first images of the pairs of training eye region images have a gaze angle difference with respect to second images of the pairs of training eye region images, and means for training the pretrained neural network based on an encode of the first images by the pretrained neural network to generate training stage compressed features, a decode of the training stage compressed features to generate resultant first images corresponding to the first images, and a scoring of the first images and the resultant first images.

Further to the third embodiments, the system further comprises means for receiving a plurality of pairs of training eye region images, wherein first images of the pairs of training eye region images have a gaze angle difference with respect to second images of the pairs of training eye region images and means for training the pretrained neural network based on an encode of the first images by the pretrained neural network to generate training stage compressed features, a decode of the training stage compressed features to generate resultant first images corresponding to the first images, and a scoring of the first images and the resultant first images, wherein the scoring of the first images and the resultant first images comprises vertically filtering the first images and the resultant first images to generate vertically filtered first images and vertically filtered resultant first images, respectively, and determining an error between the vertically filtered first images and the vertically filtered resultant first images.

Further to the third embodiments, the system further comprises means for receiving a plurality of pairs of training eye region images, wherein first images of the pairs of training eye region images have a gaze angle difference with respect to second images of the pairs of training eye region images, means for training the pretrained neural network based on an encode of the first images by the pretrained neural network to generate training stage compressed features, a decode of the training stage compressed features to generate resultant first images corresponding to the first images, and a scoring of the first images and the resultant first images, means for generating a likelihood map for each pixel of each of the first images of the pairs of training eye region images, wherein each likelihood map comprises a sum of absolute differences for each of a plurality of candidate motion vectors corresponding to the pixel, and means for training a training stage pretrained classifier based on the likelihood maps and the training stage compressed features.

In one or more fourth embodiments, at least one machine readable medium comprises a plurality of instructions that, in response to being executed on a device, cause the device to provide eye contact correction by encoding, via a pretrained neural network, an eye region of a source image to generate compressed features corresponding to the eye region of the source image, applying a pretrained classifier to the compressed features to determine a motion vector field for the eye region of the source image, and warping the eye region of the source image based on the motion vector field and integrating the warped eye region into a remaining portion of the source image to generate an eye contact corrected image.

Further to the fourth embodiments, the pretrained neural network comprises a plurality of layers including at least one convolutional neural network layer.

Further to the fourth embodiments, said encoding of the eye region and said applying the pretrained classifier to the compressed features to determine the motion vector field for the eye region of the source image are selectively provided based on a camera and a display having a first relative position therebetween, and the machine readable medium further comprises a plurality of instructions that, in response to being executed on the device, cause the device to, when the camera and the display have a second relative position therebetween, provide eye contact correction by encoding, via a second pretrained neural network, the eye region of the source image to generate second compressed features corresponding to the eye region of the source image, applying a second pretrained classifier to the second compressed features to determine a second motion vector field for the eye region of the source image, and warping the eye region of the source image based on the second motion vector field and integrating the warped eye region into the remaining portion of the source image to generate the eye contact corrected image.

Further to the fourth embodiments, the machine readable medium further comprises a plurality of instructions that, in response to being executed on the device, cause the device to provide eye contact correction by receiving a plurality of pairs of training eye region images, wherein first images of the pairs of training eye region images have a gaze angle difference with respect to second images of the pairs of training eye region images and training the pretrained neural network based on an encode of the first images by the pretrained neural network to generate training stage compressed features, a decode of the training stage compressed features to generate resultant first images corresponding to the first images, and a scoring of the first images and the resultant first images.

Further to the fourth embodiments, the machine readable medium further comprises a plurality of instructions that, in response to being executed on the device, cause the device to provide eye contact correction by receiving a plurality of pairs of training eye region images, wherein first images of the pairs of training eye region images have a gaze angle difference with respect to second images of the pairs of training eye region images and training the pretrained neural network based on an encode of the first images by the pretrained neural network to generate training stage compressed features, a decode of the training stage compressed features to generate resultant first images corresponding to the first images, and a scoring of the first images and the resultant first images, wherein the scoring of the first images and the resultant first images comprises vertically filtering the first images and the resultant first images to generate vertically filtered first images and vertically filtered resultant first images, respectively, and determining an error between the vertically filtered first images and the vertically filtered resultant first images.

Further to the fourth embodiments, the machine readable medium further comprises a plurality of instructions that, in response to being executed on the device, cause the device to provide eye contact correction by receiving a plurality of pairs of training eye region images, wherein first images of the pairs of training eye region images have a gaze angle difference with respect to second images of the pairs of training eye region images, training the pretrained neural network based on an encode of the first images by the pretrained neural network to generate training stage compressed features, a decode of the training stage compressed features to generate resultant first images corresponding to the first images, and a scoring of the first images and the resultant first images, generating a likelihood map for each pixel of each of the first images of the pairs of training eye region images, wherein each likelihood map comprises a sum of absolute differences for each of a plurality of candidate motion vectors corresponding to the pixel, training a training stage pretrained classifier based on the likelihood maps and the training stage compressed features, and compressing the training stage pretrained classifier by parameterized surface fitting to generate the pretrained classifier.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A machine implemented method for providing eye contact correction comprising:
    receiving input image data of an already detected eye region of a source image;
    encoding, via a pretrained neural network, the image data of the eye region comprising:
        inputting the image data of the eye region into the neural network and without a remainder of a face forming the eye region from the source image, and
        outputting compressed features at a layer of the neural network and corresponding to the eye region of the source image and being decodable to form image data that can be compared to image data of the source image;
    applying a pretrained classifier to the compressed features to provide classifier output that is a motion vector field comprising multiple motion vectors that each indicate motion of pixel image data from a single pixel location from one image with an eye gaze in one direction and to a pixel location of a second image with an eye gaze in a different direction than the one direction, and for the eye region of the source image to move image data on a version of the source image; and
    warping the eye region of the source image based on the motion vector field and integrating the warped eye region into a remaining portion of the source image to generate an eye contact corrected image.

2. The method of claim 1, wherein the pretrained neural network comprises a plurality of layers including at least one convolutional neural network layer.

3. The method of claim 1, wherein the pretrained neural network comprises four layers, the four layers comprising, in order: a first convolutional neural network layer, a second convolutional neural network layer, a first fully connected layer, and a second fully connected layer, wherein the second fully connected layer provides the compressed features.

4. The method of claim 1, wherein the pretrained classifier comprises a pretrained random forest classifier having a leaf corresponding to the motion vector field.

5. The method of claim 1, further comprising:
    providing face detection and face landmark detection on the source image; and
    cropping the source image based on the face detection and the face landmark detection to generate the eye region.

6. The method of claim 1, further comprising:
    encoding and transmitting the final image to a remote device for presentment to a user.

7. The method of claim 1, wherein said encoding of the eye region and said applying the pretrained classifier to the compressed features to determine the motion vector field for the eye region of the source image are selectively provided based on a camera and a display having a first relative position therebetween, the method further comprising, when the camera and the display have a second relative position therebetween:
encoding, via a second pretrained neural network, the eye region of the source image to generate second compressed features corresponding to the eye region of the source image;
applying a second pretrained classifier to the second compressed features to determine a second motion vector field for the eye region of the source image; and
warping the eye region of the source image based on the second motion vector field and integrating the warped eye region into the remaining portion of the source image to generate the eye contact corrected image.

8. The method of claim 1, further comprising:
receiving a plurality of pairs of training eye region images, wherein first images of the pairs of training eye region images have a gaze angle difference with respect to second images of the pairs of training eye region images; and
training the pretrained neural network based on an encode of the first images by the pretrained neural network to generate training stage compressed features, a decode of the training stage compressed features to generate resultant first images corresponding to the first images, and a scoring of the first images and the resultant first images.

9. The method of claim 8, wherein the scoring of the first images and the resultant first images comprises an error between the first images and the resultant first images.

10. The method of claim 8, wherein the scoring of the first images and the resultant first images comprises:
vertically filtering the first images and the resultant first images to generate vertically filtered first images and vertically filtered resultant first images, respectively; and
determining an error between the vertically filtered first images and the vertically filtered resultant first images.

11. The method of claim 8, further comprising:
generating a likelihood map for each pixel of each of the first images of the pairs of training eye region images, wherein each likelihood map comprises a sum of absolute differences for each of a plurality of candidate motion vectors corresponding to the pixel; and
training a training stage pretrained classifier based on the likelihood maps and the training stage compressed features.

12. The method of claim 11, further comprising:
compressing the training stage pretrained classifier by parameterized surface fitting to generate the pretrained classifier.

13. A system for providing eye contact correction comprising:
a memory configured to store a source image; and
a processor coupled to the memory, the processor to encode, via a pretrained neural network, an eye region of a source image, the encoding comprising:
receiving input image data of an already detected eye region of the source image;
inputting the image data of the eye region into the neural network and without a remainder of a face forming the eye region from the source image, and
outputting compressed features at a layer of the neural network and corresponding to the eye region of the source image and being decodable to form image data that can be compared to image data of the source image,
the processor to apply a pretrained classifier to the compressed features to provide classifier output that is a motion vector field comprising multiple motion vectors that each indicate motion of pixel image data from a pixel location from one image with an eye gaze in one direction and to a pixel location of a second image with an eye gaze in a different direction than the one direction, and for the eye region of the source image to move image data on a version of the source image, and to warp the eye region of the source image based on the motion vector field and integrate the warped eye region into a remaining portion of the source image to generate an eye contact corrected image.

14. The system of claim 13, wherein the pretrained neural network comprises a plurality of layers including at least one convolutional neural network layer.

15. The system of claim 13, wherein the pretrained classifier comprises a pretrained random forest classifier having a leaf corresponding to the motion vector field.

16. The system of claim 13, wherein to encode the eye region and to apply the pretrained classifier to the compressed features to determine the motion vector field for the eye region of the source image are selectively provided based on a camera and a display having a first relative position therebetween, the processor further, when the camera and the display have a second relative position therebetween, to encode, via a second pretrained neural network, the eye region of the source image to generate second compressed features corresponding to the eye region of the source image, to apply a second pretrained classifier to the second compressed features to determine a second motion vector field for the eye region of the source image, and to warp the eye region of the source image based on the second motion vector field and integrate the warped eye region into the remaining portion of the source image to generate the eye contact corrected image.

17. The system of claim 13, wherein the processor is further to receive a plurality of pairs of training eye region images, wherein first images of the pairs of training eye region images have a gaze angle difference with respect to second images of the pairs of training eye region images, and to train the pretrained neural network based on an encode of the first images by the pretrained neural network to generate training stage compressed features, a decode of the training stage compressed features to generate resultant first images corresponding to the first images, and a scoring of the first images and the resultant first images.

18. The system of claim 17, wherein the scoring of the first images and the resultant first images comprises to processor to vertically filter the first images and the resultant first images to generate vertically filtered first images and vertically filtered resultant first images, respectively, and to determine an error between the vertically filtered first images and the vertically filtered resultant first images.

19. The system of claim 17, wherein the processor is further to generate a likelihood map for each pixel of each of the first images of the pairs of training eye region images, wherein each likelihood map comprises a sum of absolute differences for each of a plurality of candidate motion vectors corresponding to the pixel, and to train a training stage pretrained classifier based on the likelihood maps and the training stage compressed features.

20. At least one non-transitory machine readable medium comprising a plurality of instructions that, in response to being executed on a device, cause the device to provide eye contact correction by:

receiving input image data of an already detected eye region of a source image;

encoding, via a pretrained neural network, the image data of the eye region comprising:

inputting the image data of the eye region into the neural network and without a remainder of a face forming the eye region from the source image, and outputting compressed features at a layer of the neural network and corresponding to the eye region of the source image and being decodable to form image data that is comparable to image data of the source image;

applying a pretrained classifier to the compressed features to provide classifier output that is a motion vector field comprising multiple motion vectors that each indicate motion of pixel image data from a single pixel location from one image with an eye gaze in one direction and to a pixel location of a second image with an eye gaze in a different direction than the one direction, and for the eye region of the source image to move image data on a version of the source image; and warping the eye region of the source image based on the motion vector field and integrating the warped eye region into a remaining portion of the source image to generate an eye contact corrected image.

21. The machine readable medium of claim 20, wherein the pretrained neural network comprises a plurality of layers including at least one convolutional neural network layer.

22. The machine readable medium of claim 20, wherein said encoding of the eye region and said applying the pretrained classifier to the compressed features to determine the motion vector field for the eye region of the source image are selectively provided based on a camera and a display having a first relative position therebetween, the machine readable medium further comprising a plurality of instructions that, in response to being executed on the device, cause the device to, when the camera and the display have a second relative position therebetween, provide eye contact correction by:

encoding, via a second pretrained neural network, the eye region of the source image to generate second compressed features corresponding to the eye region of the source image;

applying a second pretrained classifier to the second compressed features to determine a second motion vector field for the eye region of the source image; and warping the eye region of the source image based on the second motion vector field and integrating the warped eye region into the remaining portion of the source image to generate the eye contact corrected image.

23. The machine readable medium of claim 20, further comprising a plurality of instructions that, in response to being executed on the device, cause the device to provide eye contact correction by:

receiving a plurality of pairs of training eye region images, wherein first images of the pairs of training eye region images have a gaze angle difference with respect to second images of the pairs of training eye region images; and training the pretrained neural network based on an encode of the first images by the pretrained neural network to generate training stage compressed features, a decode of the training stage compressed features to generate resultant first images corresponding to the first images, and a scoring of the first images and the resultant first images.

24. The machine readable medium of claim 23, wherein the scoring of the first images and the resultant first images comprises:

vertically filtering the first images and the resultant first images to generate vertically filtered first images and vertically filtered resultant first images, respectively; and determining an error between the vertically filtered first images and the vertically filtered resultant first images.

25. The machine readable medium of claim 23, further comprising a plurality of instructions that, in response to being executed on the device, cause the device to provide eye contact correction by:

generating a likelihood map for each pixel of each of the first images of the pairs of training eye region images, wherein each likelihood map comprises a sum of absolute differences for each of a plurality of candidate motion vectors corresponding to the pixel;

training a training stage pretrained classifier based on the likelihood maps and the training stage compressed features; and compressing the training stage pretrained classifier by parameterized surface fitting to generate the pretrained classifier.

* * * * *